(12) United States Patent
Iinuma

(10) Patent No.: US 10,642,563 B2
(45) Date of Patent: May 5, 2020

(54) APPARATUS AND METHOD TO PERFORM SCREEN SHARING BETWEEN TERMINAL DEVICES IN A WIRELESS NETWORK VIA ANOTHER WIRELESS NETWORK

(71) Applicant: Fujitsu Client Computing Limited, Kanagawa (JP)

(72) Inventor: Nobuharu Iinuma, Yokohama (JP)

(73) Assignee: FUJITSU CLIENT COMPUTING LIMITED, Kanagawa (JP)

(*) Notice: Subject to any disclaimer, the term of this patent is extended or adjusted under 35 U.S.C. 154(b) by 4 days.

(21) Appl. No.: 15/710,946

(22) Filed: Sep. 21, 2017

(65) Prior Publication Data
US 2018/0095712 A1 Apr. 5, 2018

(30) Foreign Application Priority Data
Sep. 30, 2016 (JP) ................. 2016-194853

(51) Int. Cl.
| | | |
|---|---|---|
| G06F 3/048 | (2013.01) | |
| G06F 3/14 | (2006.01) | |
| H04M 1/725 | (2006.01) | |
| H04W 4/12 | (2009.01) | |
| H04W 88/04 | (2009.01) | |
| H04W 88/10 | (2009.01) | |

(52) U.S. Cl.
CPC ........ *G06F 3/1454* (2013.01); *H04M 1/7253* (2013.01); *H04M 1/72527* (2013.01); *H04W 4/12* (2013.01); *G06F 3/1423* (2013.01); *G09G 2370/025* (2013.01); *G09G 2370/16* (2013.01); *H04W 88/04* (2013.01); *H04W 88/10* (2013.01)

(58) Field of Classification Search
CPC .................................................... G06F 3/1454
See application file for complete search history.

(56) References Cited

U.S. PATENT DOCUMENTS

| | | | | |
|---|---|---|---|---|
| 2006/0079230 | A1* | 4/2006 | Russell ................. | H04W 48/20 455/434 |
| 2009/0034498 | A1* | 2/2009 | Banerjea ............... | H04W 76/15 370/338 |
| 2013/0016283 | A1* | 1/2013 | Nissan-Cohen ... | H04N 21/4122 348/552 |
| 2016/0192230 | A1* | 6/2016 | Metke ................. | H04W 28/021 370/338 |
| 2016/0269957 | A1* | 9/2016 | Cho ........................ | H04W 4/70 |
| 2017/0280495 | A1* | 9/2017 | Zhang .................... | H04W 76/19 |
| 2019/0012916 | A1* | 1/2019 | Nordbruch ............. | G08G 1/142 |

FOREIGN PATENT DOCUMENTS

| | | |
|---|---|---|
| JP | 2005-175814 A | 6/2005 |
| JP | 2009-187084 A | 8/2009 |

\* cited by examiner

*Primary Examiner* — Keith D Bloomquist
(74) *Attorney, Agent, or Firm* — Osha Liang LLP

(57) ABSTRACT

An apparatus obtains, from an access point, connection status information of each of terminal devices that are coupled to a first wireless network via the access point, and detects a first terminal device which is a terminal device whose communication with the access point is disconnected, with reference to the connection status information. The apparatus notifies, via the first wireless network, a second terminal device coupled to the access point, of an instruction for causing the second terminal device to transmit display information displayed on the second terminal device to the first terminal device by using the second wireless network.

9 Claims, 15 Drawing Sheets

FIG. 3

| TABLET TERMINAL | MAC ADDRESS | TRANSMISSION CHANNEL | | |
|---|---|---|---|---|
| | | FIRST TIME | SECOND TIME | THIRD TIME |
| STUDENT A | A1:B2:C3:F3:E2:D1 | 37 ch | 37 ch | 37 ch |
| STUDENT B | A1:B2:C3:F3:E2:D2 | 37 ch | 37 ch | 38 ch |
| STUDENT C | A1:B2:C3:F3:E2:D3 | 37 ch | 37 ch | 39 ch |
| STUDENT D | A1:B2:C3:F3:E2:D4 | 37 ch | 38 ch | 37 ch |
| STUDENT E | A1:B2:C3:F3:E2:D5 | 37 ch | 38 ch | 38 ch |
| STUDENT F | A1:B2:C3:F3:E2:D6 | 37 ch | 38 ch | 39 ch |
| STUDENT G | A1:B2:C3:F3:E2:D7 | 37 ch | 39 ch | 37 ch |
| STUDENT H | A1:B2:C3:F3:E2:D8 | 37 ch | 39 ch | 38 ch |
| STUDENT I | A1:B2:C3:F3:E2:D9 | 37 ch | 39 ch | 39 ch |
| STUDENT J | A1:B2:C3:F3:E2:DA | 38 ch | 37 ch | 37 ch |
| STUDENT K | A1:B2:C3:F3:E2:DB | 38 ch | 37 ch | 38 ch |
| STUDENT L | A1:B2:C3:F3:E2:DC | 38 ch | 37 ch | 39 ch |
| STUDENT M | A1:B2:C3:F3:E2:DD | 38 ch | 38 ch | 37 ch |
| STUDENT O | A1:B2:C3:F3:E2:DE | 38 ch | 38 ch | 38 ch |
| STUDENT P | A1:B2:C3:F3:E2:DF | 38 ch | 38 ch | 39 ch |
| STUDENT Q | A1:B2:C3:F3:E2:E0 | 38 ch | 39 ch | 37 ch |
| STUDENT R | A1:B2:C3:F3:E2:E1 | 38 ch | 39 ch | 38 ch |
| STUDENT S | A1:B2:C3:F3:E2:E2 | 38 ch | 39 ch | 39 ch |
| STUDENT T | A1:B2:C3:F3:E2:E3 | 39 ch | 37 ch | 37 ch |
| STUDENT U | A1:B2:C3:F3:E2:E4 | 39 ch | 37 ch | 38 ch |
| STUDENT V | A1:B2:C3:F3:E2:E5 | 39 ch | 37 ch | 39 ch |
| STUDENT W | A1:B2:C3:F3:E2:E6 | 39 ch | 38 ch | 37 ch |
| STUDENT X | A1:B2:C3:F3:E2:E7 | 39 ch | 38 ch | 38 ch |
| STUDENT Y | A1:B2:C3:F3:E2:E8 | 39 ch | 38 ch | 39 ch |
| STUDENT Z | A1:B2:C3:F3:E2:E9 | 39 ch | 39 ch | 37 ch |
| STUDENT α | A1:B2:C3:F3:E2:EA | 39 ch | 39 ch | 38 ch |
| STUDENT β | A1:B2:C3:F3:E2:EB | 39 ch | 39 ch | 39 ch |

FIG. 4

| TABLET TERMINAL | MAC ADDRESS | STATUS | RECEIVING SENSITIVITY | DISCONNECTION TIME | DISCONNECTION REASON |
|---|---|---|---|---|---|
| STUDENT A | A1:B2:C3:F3:E2:D1 | CONNECTING | SLIGHTLY WEAK | — | — |
| STUDENT B | A1:B2:C3:F3:E2:D2 | CONNECTING | SLIGHTLY WEAK | — | — |
| STUDENT C | A1:B2:C3:F3:E2:D3 | UNCONNECTED SCREEN SHARING (RECEIVING SIDE) | — | 9:45 | UNEXPECTED DISCONNECTION |
| STUDENT D | A1:B2:C3:F3:E2:D4 | UNCONNECTED SCREEN SHARING (TRANSMITTING SIDE) | GOOD | — | — |
| STUDENT E | A1:B2:C3:F3:E2:D5 | CONNECTING | GOOD | — | — |
| STUDENT F | A1:B2:C3:F3:E2:D6 | CONNECTING | GOOD | — | — |
| STUDENT G | A1:B2:C3:F3:E2:D7 | CONNECTING | GOOD | — | — |
| STUDENT H | A1:B2:C3:F3:E2:D8 | CONNECTING | GOOD | — | — |
| STUDENT I | A1:B2:C3:F3:E2:D9 | CONNECTING | GOOD | — | — |
| STUDENT J | A1:B2:C3:F3:E2:DA | CONNECTING | GOOD | — | — |
| STUDENT K | A1:B2:C3:F3:E2:DB | CONNECTING | GOOD | — | — |
| STUDENT L | A1:B2:C3:F3:E2:DC | CONNECTING | GOOD | — | — |
| STUDENT M | A1:B2:C3:F3:E2:DD | CONNECTING | GOOD | — | — |
| STUDENT O | A1:B2:C3:F3:E2:DE | CONNECTING | GOOD | — | — |
| STUDENT P | A1:B2:C3:F3:E2:DF | CONNECTING | GOOD | — | — |
| STUDENT Q | A1:B2:C3:F3:E2:E0 | CONNECTING | GOOD | — | — |
| STUDENT R | A1:B2:C3:F3:E2:E1 | CONNECTING | GOOD | — | — |
| STUDENT S | A1:B2:C3:F3:E2:E2 | CONNECTING | GOOD | — | — |
| STUDENT T | A1:B2:C3:F3:E2:E3 | CONNECTING | GOOD | — | — |
| STUDENT U | A1:B2:C3:F3:E2:E4 | CONNECTING | GOOD | — | — |
| STUDENT V | A1:B2:C3:F3:E2:E5 | CONNECTING | GOOD | — | — |
| STUDENT W | A1:B2:C3:F3:E2:E6 | CONNECTING | SLIGHTLY WEAK | — | — |
| STUDENT X | A1:B2:C3:F3:E2:E7 | CONNECTING | SLIGHTLY WEAK | — | — |
| STUDENT Y | A1:B2:C3:F3:E2:E8 | CONNECTING | SLIGHTLY WEAK | — | — |
| STUDENT Z | A1:B2:C3:F3:E2:E9 | CONNECTING | SLIGHTLY WEAK | — | — |
| STUDENT α | A1:B2:C3:F3:E2:EA | CONNECTING | SLIGHTLY WEAK | — | — |
| STUDENT β | A1:B2:C3:F3:E2:EB | CONNECTING | SLIGHTLY WEAK | — | — |

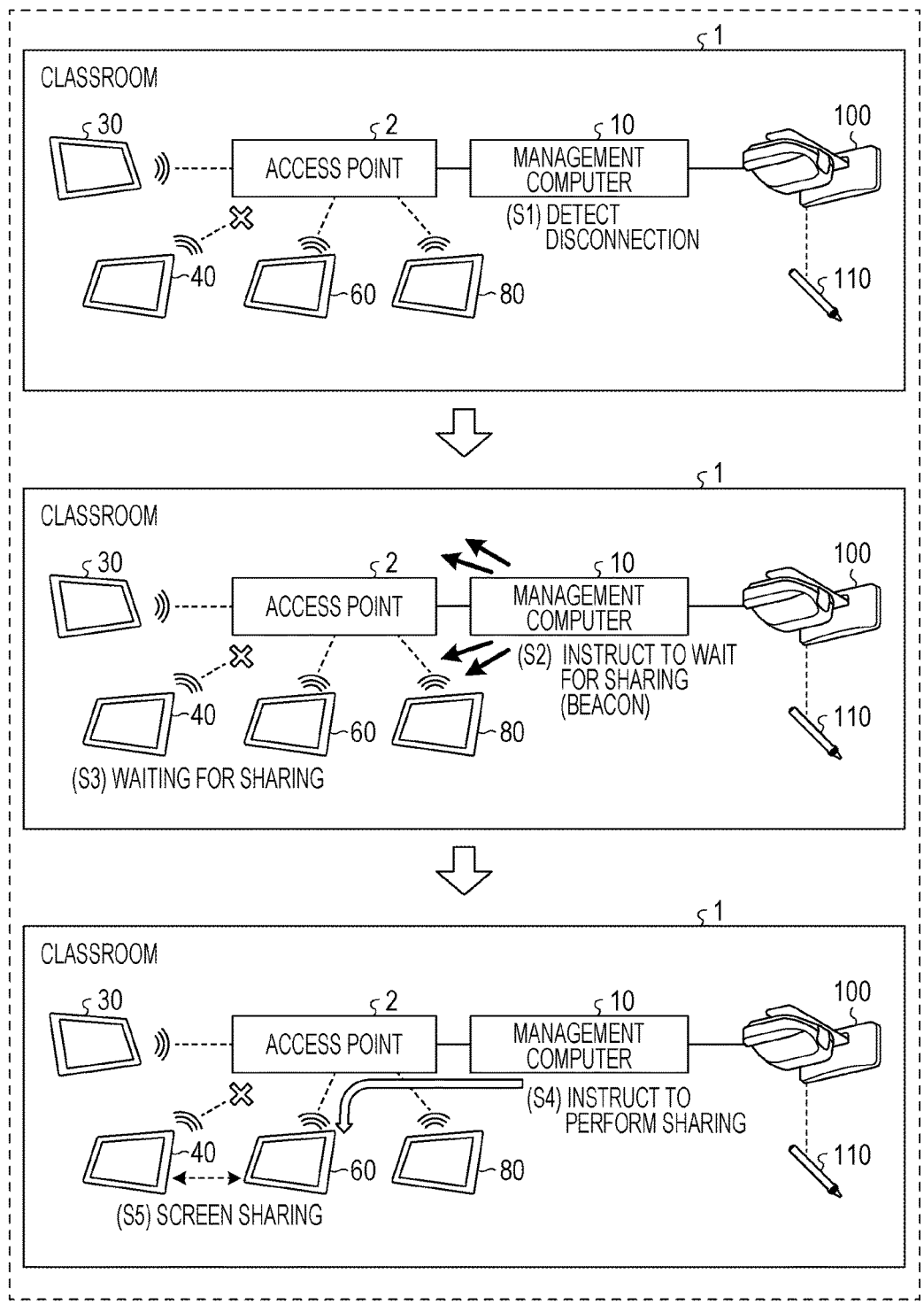

FIG. 11

| TABLET TERMINAL | MAC ADDRESS | BD ADDRESS |
|---|---|---|
| STUDENT A | A1:B2:C3:F3:E2:D1 | B1:C2:D3:G3:F2:E1 |
| STUDENT B | A1:B2:C3:F3:E2:D2 | B1:C2:D3:G3:F2:E2 |
| STUDENT C | A1:B2:C3:F3:E2:D3 | B1:C2:D3:G3:F2:E3 |
| STUDENT D | A1:B2:C3:F3:E2:D4 | B1:C2:D3:G3:F2:E4 |
| STUDENT E | A1:B2:C3:F3:E2:D5 | B1:C2:D3:G3:F2:E5 |
| STUDENT F | A1:B2:C3:F3:E2:D6 | B1:C2:D3:G3:F2:E6 |
| STUDENT G | A1:B2:C3:F3:E2:D7 | B1:C2:D3:G3:F2:E7 |
| STUDENT H | A1:B2:C3:F3:E2:D8 | B1:C2:D3:G3:F2:E8 |
| STUDENT I | A1:B2:C3:F3:E2:D9 | B1:C2:D3:G3:F2:E9 |
| STUDENT J | A1:B2:C3:F3:E2:DA | B1:C2:D3:G3:F2:EA |
| STUDENT K | A1:B2:C3:F3:E2:DB | B1:C2:D3:G3:F2:EB |
| STUDENT L | A1:B2:C3:F3:E2:DC | B1:C2:D3:G3:F2:EC |
| STUDENT M | A1:B2:C3:F3:E2:DD | B1:C2:D3:G3:F2:ED |
| STUDENT O | A1:B2:C3:F3:E2:DE | B1:C2:D3:G3:F2:EE |
| STUDENT P | A1:B2:C3:F3:E2:DF | B1:C2:D3:G3:F2:EF |
| STUDENT Q | A1:B2:C3:F3:E2:E0 | B1:C2:D3:G3:F2:F0 |
| STUDENT R | A1:B2:C3:F3:E2:E1 | B1:C2:D3:G3:F2:F1 |
| STUDENT S | A1:B2:C3:F3:E2:E2 | B1:C2:D3:G3:F2:F2 |
| STUDENT T | A1:B2:C3:F3:E2:E3 | B1:C2:D3:G3:F2:F3 |
| STUDENT U | A1:B2:C3:F3:E2:E4 | B1:C2:D3:G3:F2:F4 |
| STUDENT V | A1:B2:C3:F3:E2:E5 | B1:C2:D3:G3:F2:F5 |
| STUDENT W | A1:B2:C3:F3:E2:E6 | B1:C2:D3:G3:F2:F6 |
| STUDENT X | A1:B2:C3:F3:E2:E7 | B1:C2:D3:G3:F2:F7 |
| STUDENT Y | A1:B2:C3:F3:E2:E8 | B1:C2:D3:G3:F2:F8 |
| STUDENT Z | A1:B2:C3:F3:E2:E9 | B1:C2:D3:G3:F2:F9 |
| STUDENT α | A1:B2:C3:F3:E2:EA | B1:C2:D3:G3:F2:FA |
| STUDENT β | A1:B2:C3:F3:E2:EB | B1:C2:D3:G3:F2:FB |

APPARATUS AND METHOD TO PERFORM SCREEN SHARING BETWEEN TERMINAL DEVICES IN A WIRELESS NETWORK VIA ANOTHER WIRELESS NETWORK

CROSS-REFERENCE TO RELATED APPLICATION

This application is based upon and claims the benefit of priority of the prior Japanese Patent Application No. 2016-194853, filed on Sep. 30, 2016, the entire contents of which are incorporated herein by reference.

FIELD

The embodiments discussed herein are related to apparatus and method to perform screen sharing between terminal devices in a wireless network via another wireless network.

BACKGROUND

According to a promotion of information and communication technology (ICT) education by government policy, for elementary and junior high schools all over the country, one tablet computer (hereinafter, may be referred to as "tablet") per 3.6 students is deployed by the year 2017 and one per one student is deployed by the year 2020, and an achievement rate of 100% in maintenance of a wireless local area network (LAN) is planned.

In this way, although ICT education has been gradually processed at each of schools, even now, there are schools which provide classes with a digital textbook by deploying an electronic blackboard, a wireless LAN access point (hereinafter, may be referred to as "AP"), a tablet for teacher, and a tablet for student in each of classrooms. In recent years, a technology in which when a terminal device such as a tablet or the like is coupled to another terminal device via a wireless LAN and disconnection from the wireless LAN is detected, a user performs a connection procedure with a wired LAN is known.

Japanese Laid-open Patent Publication No. 2005-175814 is an example of the related art.

SUMMARY

According to an aspect of the invention, an apparatus obtains, from an access point, connection status information of each of terminal devices that are coupled to a first wireless network via the access point, and detects a first terminal device which is a terminal device whose communication with the access point is disconnected, with reference to the connection status information. The apparatus notifies, via the first wireless network, a second terminal device coupled to the access point, of an instruction for causing the second terminal device to transmit display information displayed on the second terminal device to the first terminal device by using the second wireless network.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of information stored in a beacon pattern database (DB), according to an embodiment;

FIG. 4 is a diagram illustrating an example of information stored in a connection status DB, according to an embodiment;

FIG. 5 is a diagram illustrating an example of screen sharing, according to an embodiment;

FIG. 11 is a diagram illustrating an example of information stored in an address information DB, according to an embodiment;

DESCRIPTION OF EMBODIMENTS

Since elementary school students generally do not have high information Technology (IT) literacy, it is difficult to reconnect terminal devices disconnected from a wireless network to a wired network or a wireless network. For this reason, while a teacher manually restores the terminal, a class screen or the like is not displayed on the terminal device disconnected from the wireless network and a student who may not take a class occurs. In addition, since the teacher stops the class and restores the terminal device every time disconnection of the terminal device occurs, a progress of the class is hindered. In a case where the teacher's IT literacy is low, a stop time of the class will be even longer.

It is also conceivable that a tablet terminal has a function of constantly monitoring communication with AP, and a function of executing restarting of an operating system (OS) of the tablet and executing AP reconnection when detecting disconnection. However, since tablet terminals are equipped with processors with lower performance than general personal computers, a screen display or the like is delayed when these functions are included.

It is preferable to display information delivered to a terminal device disconnected from a wireless network via another wireless network.

Hereinafter, examples of a monitoring device, a screen sharing method, and a screen sharing program disclosed in the present application will be described in detail with reference to drawings. The embodiment is not limited by this example. In addition, each of the examples can be appropriately combined within a range without contradiction.

Example 1

Overall Configuration Example

Figure 1:
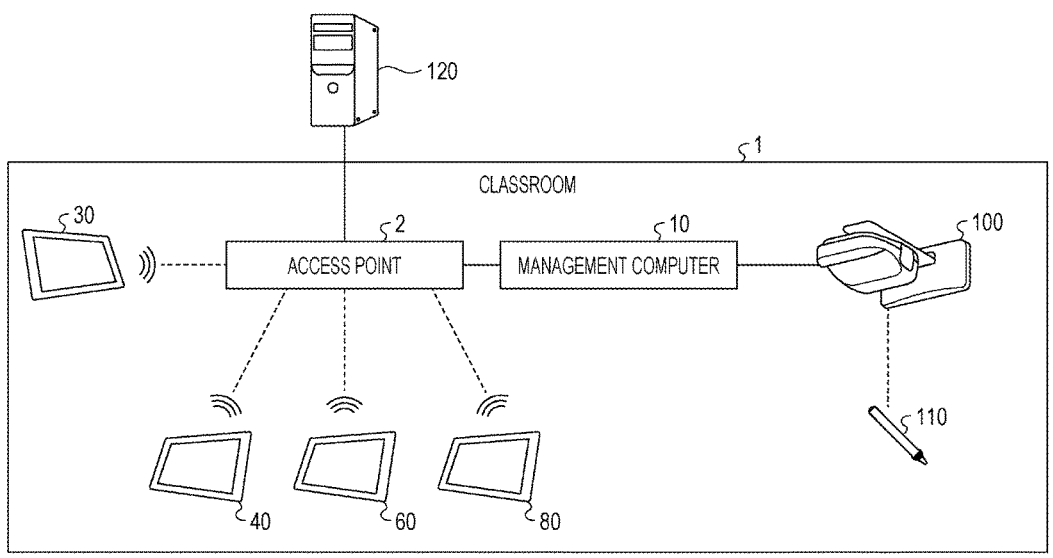
FIG. 1 is a diagram illustrating an example of an overall configuration of a system, according to an embodiment.

FIG. 1 is a diagram illustrating an overall configuration example of a system according to Example 1. In Example 1, as an example, a school class or the like is assumed. For example, a wireless LAN is built in a classroom, tablet terminals are distributed to each student and teacher, and a class is held by displaying information such as a textbook on the tablet terminal by using the wireless LAN.

FIG. 1 illustrates a classroom 1 and a server 120 installed outside the classroom 1. In the classroom 1, a wireless LAN such as a Wireless-Fidelity (Wi-Fi) (registered trademark) is built and the classroom 1 includes an access point 2, a management computer 10, a tablet terminal 30 for teacher, tablet terminals 40, 60, and 80 for student, an electronic blackboard projector 100, and an electronic pen 110.

The access point 2 is an example of a device which couples each of tablet terminals in the classroom 1 to a wireless LAN and couples the external server 120 to the wireless LAN in the classroom 1, and is generally a computer such as a router, a station, for example.

The tablet terminal 30 for teacher and the tablet terminals 40, 60, and 80 for students are examples of portable mobile terminals and are computers having a touch panel, a wireless connection function, and the like. These tablet terminals are equipped with processors having lower performance than an ordinary personal computer for the purpose of reducing the thickness and weight, and the battery operation.

In addition, these tablet terminals are coupled to a wireless LAN via the access point 2 and are coupled to each other so as to communicate with each other. Further, each of the tablet terminals is coupled to the external server 120 via the access point 2. Each of the tablet terminals displays textbook data delivered from the management computer 10 or the server 120. Here, a class is held using textbook data instead of an ordinary textbook.

The management computer 10 is an example of a computer such as a monitoring device and is coupled to the access point 2 via a wireless LAN or a wired line. The management computer 10 obtains textbook data from the server 120 via the access point 2 and delivers the data to each of the tablet terminals coupled to a wireless LAN via the access point 2.

For example, the electronic blackboard projector 100 is coupled to the management computer 10 via a wired line such as a High-Definition Multimedia Interface (HDMI) (registered trademark). The electronic blackboard projector 100 projects various images and videos input from the management computer 10 on a screen. In addition, the electronic blackboard projector 100 is coupled to the electronic pen 110 by infrared rays or the like and projects operation information by the electronic pen 110 on the screen together with various images and videos input from the management computer 10.

The server 120 is an example of an external server which is coupled to the access point 2 and possesses textbook data. Upon receiving a request for data acquisition from each of the tablet terminals or the management computer 10, the server 120 transmits the textbook data to a request destination via the access point 2.

In this way, in a state in which the tablet terminal 30 for teacher and the tablet terminals 40, 60, and 80 for students are coupled to a wireless LAN via the access point 2, the management computer 10 obtains connection status of each of the tablet terminals coupled to a wireless LAN via the access point 2 from the access point 2. The management computer 10 detects a tablet terminal (hereinafter, sometimes described as "disconnected tablet") disconnected from communication with the access point 2 with reference to the connection status. Thereafter, the management computer 10 notifies, to another tablet terminal coupled to the access point 2, an instruction for transmitting information displayed on the other tablet terminal to the tablet terminal being disconnected via the access point 2. The disconnection tablet is notified of an instruction for receiving screen sharing from another tablet terminal by using a Bluetooth (registered trademark) Low Energy (BLE) beacon.

Therefore, upon detecting a tablet for student disconnected from a wireless LAN in a classroom of a class, the management computer 10 executes screen sharing between a tablet terminal coupled to a wireless LAN and a tablet terminal being disconnected from a wireless LAN. As a result, the tablet terminal disconnected from a wireless LAN may display information delivered from a wireless LAN without a teacher or a student performing recovery operation.

Functional Configuration

Next, functional configurations of devices illustrated FIG. 1 will be described. Here, functional configurations of the management computer 10 and each of the tablet terminals having a function different from a general device will be described. As an example, a tablet terminal disconnected from a wireless LAN is described as the tablet terminal 40 and a tablet terminal which is coupled to a wireless LAN and performs screen sharing is described as the tablet terminal 60, but each of the tablet terminals has a function of the tablet terminal 40 and a function of the tablet terminal 60.

Functional Configuration of Management Computer 10

Figure 2:
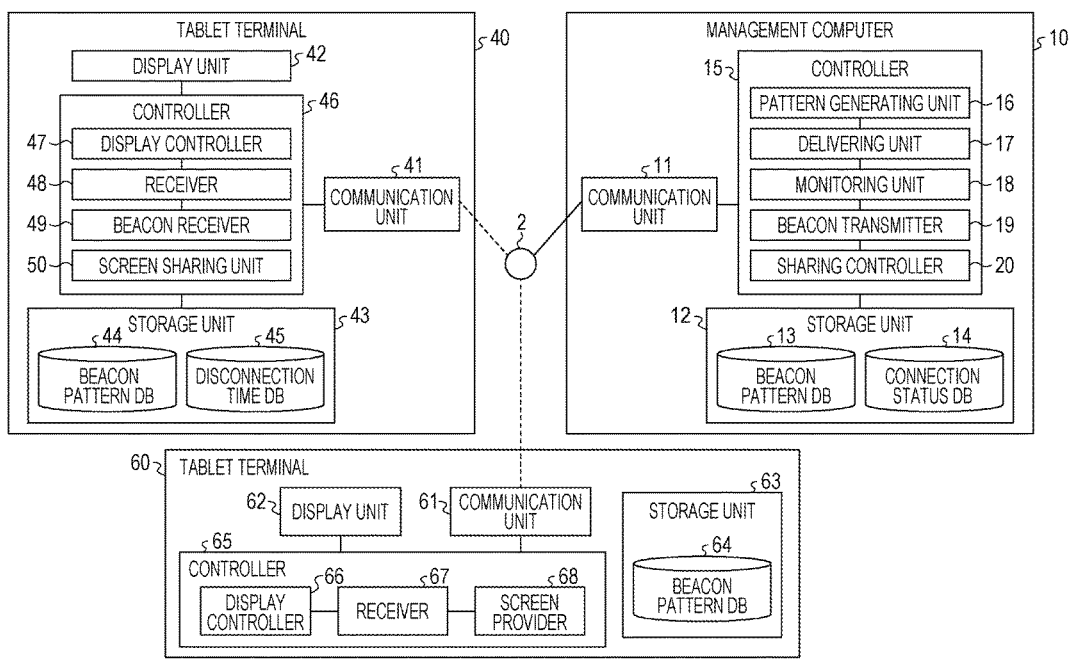
FIG. 2 is a diagram illustrating an example of a functional configuration of each of devices, according to an embodiment.

FIG. 2 is a functional block diagram illustrating a functional configuration of each of devices according to Example 1. As illustrated in FIG. 2, the management computer 10 includes a communication unit 11, a storage unit 12, and a controller 15.

The communication unit 11 is a processing unit which controls various communications such as a wireless communication or a wired communication. For example, the communication unit 11 is coupled to a wireless LAN via the access point 2, transmits information to each of the tablet terminals in the wireless LAN, and receives various kinds of information from each of the tablet terminals. For example, the communication unit 11 receives connection status from the access point 2 and transmits textbook data to each of the tablet terminals. In addition, the communication unit 11 executes transmission control of a BLE beacon or the like.

The storage unit 12 is a storage device which stores a program executed by the controller 15 or various kinds of data and is, for example, a memory or a hard disk. The storage unit 12 stores a beacon pattern DB 13 or a connection status DB 14.

The beacon pattern DB 13 is a database storing a beacon pattern which is a combination of channels of transmission frequencies of a BLE beacon. For example, the beacon pattern DB 13 is a combination of advertising channels used in the BLE beacon and stores identification information used for identifying a tablet terminal of each student.

FIG. 3 is a diagram illustrating an example of information stored in the beacon pattern DB 13. As illustrated in FIG. 3, the beacon pattern DB 13 stores "tablet terminal", "media access control (MAC) address", "transmission channel (first time, second time, and third time)" in association with each other. "tablet terminal" is a name of a tablet terminal used by a student and "MAC address" is a MAC address of the tablet terminal for each student. "transmission channel" is channel information of an advertising channel, and "first time, second time, and third time" are advertising channels used by a BLE beacon.

In the example in FIG. 3, in a case of transmitting an instruction to a tablet terminal of a student A of which a MAC address is "A1:B2:C3:F3:E2:D1", "37 ch" is used for the first time, "37 ch" is used for the second time, and "37 ch" is used for the third time. In this way, by a combination of advertising channels (37 ch, 38 ch, and 39 ch), each of the tablet terminals is identified. The combination of advertising channels may be changed for each of classes. In addition, in FIG. 3, a tablet terminal for teacher is excluded from a management target, but the tablet terminal for teacher may be included in the management target in the same manner as a tablet terminal for student.

The connection status DB 14 is a database which stores connection status of each of the tablet terminals coupled to a wireless LAN. Information stored here may be collected by the access point 2.

FIG. 4 is a diagram illustrating an example of information stored in the connection status DB 14. As illustrated in FIG. 4, the connection status DB 14 stores "tablet terminal", "MAC address", "status", "receiving sensitivity", "disconnection time", and "disconnection reason" in association with each other. Here, "tablet terminal" is a name of a tablet terminal used by a student, and "MAC address" is a MAC address of the tablet terminal for each student. "tablet terminal" and "MAC address" may be preset.

"status" is connection status and stores "connecting", "unconnected", "screen sharing (transmitting side)", or "screen sharing (receiving side)". "receiving sensitivity" is information indicating a communication quality of a wireless LAN and is, for example, a received signal strength indication (RSSI). For example, "weak" in a case where a measured value≤a first threshold, "slightly weak" in a case where the first threshold<the measured value<a second threshold, "good" in a case where the second threshold≤the measured value, and the like are set. The receiving sensitivity may be measured by the access point 2 or the management computer 10.

"disconnection time" is disconnected time. "disconnection reason" indicates whether or not a tablet terminal is disconnected during a class and is set at "unexpected disconnection" in a case where the tablet terminal is disconnected during the class. "disconnection reason" may be determined by the access point 2 or the management computer 10.

FIG. 4 illustrates that in a tablet terminal of a student C of which a MAC address is "A1:B2:C3:F3:E2:D3", "unexpected disconnection" occurs at "9:45" and screen sharing is received from a tablet terminal of a student D.

The controller 15 is a processing unit which manages whole of the management computer 10 and is, for example, a processor or the like. The controller 15 includes a pattern generating unit 16, a delivering unit 17, a monitoring unit 18, a beacon transmitter 19, and a sharing controller 20. The pattern generating unit 16, the delivering unit 17, the monitoring unit 18, the beacon transmitter 19, and the sharing controller 20 are an example of an electronic circuit included in a processor or the like or an example of a process executed by the processor.

The pattern generating unit 16 is a processing unit which generates a combination of advertising channels for identifying each of the tablet terminals. For example, the pattern generating unit 16 generates a beacon pattern illustrated in FIG. 3, and saves the beacon pattern in the beacon pattern DB 13 at a class start time. In addition, the pattern generating unit 16 also may delete information stored in the beacon pattern DB 13 at a class end time. The class start time or the class end time may be preset. In addition, as a generating method, it is possible to adopt a BLE random address setting and the like, and to arbitrarily change a combination of channels or the number of times of transmission according to the number of tablet terminals.

The delivering unit 17 is a processing unit which delivers the beacon pattern generated by the pattern generating unit 16 to each of the tablet terminals via a wireless LAN. For example, if a beacon pattern is saved in the beacon pattern DB 13, the delivering unit 17 reads the beacon pattern from the beacon pattern DB 13 and transmits, via the access point 2, the beacon pattern to each of the tablet terminals by using "MAC address" stored in the connection status DB 14 in advance.

The monitoring unit 18 is a processing unit which monitors connection status of a tablet terminal to a wireless LAN for each student. For example, the monitoring unit 18 obtains connection status (status, disconnection time, receiving sensitivity, and the like) from the access point 2 and monitors whether or not unexpected disconnection occurs. For example, the monitoring unit 18 regularly obtains connection status from the access point 2 and saves the obtained connection status in the connection status DB 14. Then, in a case of detecting status "unconnected" during a class, the monitoring unit 18 sets "unexpected disconnection" to "disconnection reason" of a tablet terminal corresponding to "unconnected".

The beacon transmitter 19 is a processing unit which notifies an instruction for receiving screen sharing from another tablet terminal, to a tablet terminal to which "unexpected disconnection" is set by the monitoring unit 18, by using BLE different from a wireless LAN. For example, the beacon transmitter 19 specifies a combination of transmission channels assigned to a tablet terminal for student being disconnected from the beacon pattern DB 13 and broadcasts an instruction for reconnection by using the specified combination.

For example, upon detecting that "unexpected disconnection" is set to a tablet terminal of the student C with reference to the connection status DB 14, the beacon transmitter 19 obtains disconnection time "9:45" from the connection status DB 14. Next, the beacon transmitter 19 obtains, from the beacon pattern DB 13, transmission channels (37 ch, 37 ch, and 39 ch) for the tablet terminal of the student C being disconnected. Then, the beacon transmitter 19 broadcasts an advertised packet including time information "9:45" which is disconnection time, via 37 ch as a BLE beacon. After a predetermined time (for example, 30 seconds), the beacon transmitter 19 broadcasts an advertised packet including time information "9:45" via 37 ch as a BLE beacon. Further, after a predetermined time (for example, 30 seconds), the beacon transmitter 19 broadcasts an advertised packet including time information "9:45" via 39 ch as a BLE beacon. Thereafter, the beacon transmitter 19 stores "screen sharing (receiving side)" in "status" of "student C" of the connection status DB 14, and notifies the sharing controller 20 that a screen sharing instruction is transmitted to "student C".

That is, by notifying a BLE beacon three times for one disconnection detection, it is possible to notify disconnection time to the tablet terminal of the student C being disconnected. The BLE beacon may include a waiting instruction or the like of screen sharing. The predetermined time may be arbitrarily changed.

In this way, by broadcasting packet data with a combination of three frequency channels, it is possible to identify a tablet terminal for student. In addition, since Bluetooth (registered trademark) device address (BD address) to be an attack target when acquired by a third party is not included in the beacon, security is high and risk of becoming the attack target of the third party becomes also small.

In addition, in a case where a disconnected tablet terminal is detected and nothing is registered as a disconnection reason, that is, "unexpected disconnection" is not registered as a disconnection reason, the beacon transmitter 19 determines that a class is ended. At this time, in a case where a tablet terminal on screen sharing exists, the beacon transmitter 19 notifies an instruction for ending screen sharing to the sharing controller 20, notifies the disconnection time by using a beacon pattern of a tablet terminal of a screen sharing destination, and transmits the instruction for ending screen sharing. Further, the beacon transmitter 19 deletes a beacon pattern stored in the beacon pattern DB 13. On the other hand, in a case where a tablet terminal on screen sharing does not exist, the beacon transmitter 19 executes deleting the beacon pattern stored in the beacon pattern DB 13.

The sharing controller 20 is a processing unit which specifies a tablet terminal of a sharing source and notifies information related to a sharing destination to the specified sharing source in a case where the beacon transmitter 19 transmits a sharing instruction to a tablet terminal.

For example, the sharing controller 20 specifies a MAC address of a tablet terminal (tablet terminal being disconnected) of the sharing destination from the beacon pattern DB 13. Next, the sharing controller 20 specifies a tablet terminal for student (sharing source) of which status is "connecting" and receiving sensitivity is "good" with reference to the connection status DB 14, and specifies a MAC address of a tablet terminal which is the specified sharing source from the connection status DB 14. Thereafter, the sharing controller 20 designates the MAC address of the sharing source and transmits the MAC address of the sharing destination and a sharing instruction via the access point 2. As a result, the sharing controller 20 is able to notify the MAC address of the sharing destination to the sharing source.

In the above example, the sharing controller 20 specifies a tablet terminal of the student D as a tablet terminal for student (sharing source) of which status is "connecting" and receiving sensitivity is "good" with reference to the connection status DB 14. Then, the sharing controller 20 designates a MAC address "A1:B2:C3:F3:E2:D4" of the tablet terminal of the student D and transmits a MAC address "A1:B2:C3:F3:E2:D3" of the tablet terminal of the student C being disconnected and a sharing instruction, via a wireless LAN. Thereafter, the sharing controller 20 stores "screen sharing (transmitting side)" to "status" of "student D" of the connection status DB 14.

Here, an example of a specifying method of a sharing source will be described. For example, the sharing controller 20 may specify an arbitrary tablet terminal as a sharing source among tablet terminals of which status is "connecting" and receiving sensitivity is "good". In addition, the sharing controller 20 may specify a tablet terminal that is the closest from a sharing destination as a sharing source among tablet terminals of which status is "connecting" and receiving sensitivity is "good". By preparing a seating chart or the like in advance, the sharing controller 20 may specify the tablet terminal which is the closest from the sharing destination.

In a case of receiving an instruction for ending screen sharing from the beacon transmitter 19, the sharing controller 20 specifies a tablet terminal of a sharing destination from the connection status DB 14. Thereafter, the sharing controller 20 instructs the tablet terminal of the sharing destination to end screen sharing by communication via the access point 2.

Functional Configuration of Tablet Terminal 40

As illustrated in FIG. 2, the tablet terminal 40 includes a communication unit 41, a display unit 42, a storage unit 43, and a controller 46.

The communication unit 41 is a processing unit which is coupled to a wireless LAN via the access point 2 and controls communication with another tablet terminal, the management computer 10, the server 120, and the like. For example, the communication unit 41 receives textbook data from the management computer 10 via the access point 2.

In addition, the communication unit 41 receives a BLE beacon broadcasted from the management computer 10. For example, the communication unit 41 receives an advertised packet including time information and the like from the management computer 10 without going through the access point 2.

In addition, the communication unit 41 receives screen information from a tablet terminal of a screen sharing source. For example, the communication unit 41 receives screen capture or the like from the tablet terminal of the screen sharing source without going through the access point 2.

The display unit 42 is a touch panel display which displays each piece of information and accepts operation of a student or the like. For example, the display unit 42 displays textbook data and accepts page turning operation, answer operation to a problem, or the like.

The storage unit 43 is a storage device which stores a program executed by the controller 46 or various kinds of data and is, for example, a memory or a hard disk. The storage unit 43 stores a beacon pattern DB 44 and a disconnection time DB 45.

The beacon pattern DB 44 is a database which stores a beacon pattern which is a combination of transmission frequency channels of a BLE beacon. For example, the beacon pattern DB 44 stores a beacon pattern delivered from the management computer 10. The stored information is the same as in FIG. 3, and a detailed description thereof will be omitted.

The disconnection time DB 45 is a database which stores a time at which the tablet terminal 40 is disconnected from a wireless LAN. For example, the disconnection time DB 45 stores disconnection time "9:45" and the like. Here, the stored disconnection time is the latest disconnection time and is updated by the controller 46.

The controller 46 is a processing unit which manages the whole of the tablet terminal 40 and is, for example, a processor or the like. The controller 46 includes a display controller 47, a receiver 48, a beacon receiver 49, and a screen sharing unit 50. The display controller 47, the receiver 48, the beacon receiver 49, and the screen sharing unit 50 are an example of an electronic circuit included in a processor or the like or an example of a process executed by the processor.

Upon detecting a tablet disconnected from a wireless LAN, the controller 46 determines whether or not disconnected time is in a time zone designated in advance such as a time zone in which a class is ended. In a case where the disconnected time is not in the time zone designated in advance, the controller 46 makes a determination of unexpected disconnection and stores the disconnection time in the disconnection time DB 45. On the other hand, in a case where the disconnected time is in the time zone designated in advance, the controller 46 makes a determination of a class end and deletes information stored in the beacon pattern DB 44.

The display controller 47 is a processing unit which executes an information display or touch panel operation. For example, the display controller 47 displays textbook data received from the management computer 10 on the display unit 42. In addition, the display controller 47 accepts touch panel operation via the display unit 42 and executes a process corresponding to the accepted touch panel operation. For example, the display controller 47 executes page turning when swipe operation is accepted and executes an enlarged display when receiving double click operation.

The receiver 48 is a processing unit which receives a beacon pattern delivered from the management computer 10. For example, the receiver 48 receives a beacon pattern from the management computer 10 via the access point 2 and stores the beacon pattern in the beacon pattern DB 44.

The beacon receiver 49 is a processing unit which receives a BLE beacon from the management computer 10. For example, in a case of receiving a BLE beacon with a beacon pattern assigned to the tablet terminal 40, the beacon receiver 49 determines that the BLE beacon is addressed to the tablet terminal 40. Next, when it is determined that the BLE beacon is addressed to the tablet terminal 40, the beacon receiver 49 determines whether or not disconnection time notified with the received each of BLE beacons matches with disconnection time stored in the disconnection time DB 45. In a case where the disconnection time matches with the disconnection time stored in the disconnection time DB 45, the beacon receiver 49 instructs the screen sharing unit 50 to perform screen sharing.

For example, a case where the tablet terminal 40 is a tablet terminal of the student C will be described. The beacon receiver 49 specifies that a beacon pattern assigned to the tablet terminal 40 is 37 ch, 37 ch, and 39 ch with reference to the beacon pattern DB 44. Thereafter, the beacon receiver 49 receives an advertised packet of a BLE beacon broadcasted from the management computer 10 via 37 ch, subsequently receives an advertised packet of a BLE beacon broadcasted via 37 ch, and lastly receives an advertised packet of a BLE beacon broadcasted via 39 ch.

Then, since each of the channels used by the management computer 10 is equal to a beacon pattern (37 ch, 37 ch, and 39 ch) of the tablet terminal 40, the beacon receiver 49 determines that the advertised packets are addressed to the tablet terminal 40. The beacon receiver 49 extracts time information from each of the received three advertised packets and instructs the screen sharing unit 50 to perform screen sharing in a case where each piece of time information matches with disconnection time (9:45) stored in the disconnection time DB 45.

In a case where a disconnection time that matches with the disconnection time held by the tablet terminal 40 is received during screen sharing via a BLE beacon using a beacon pattern of the tablet terminal 40, the beacon receiver 49 determines that screen sharing is ended. In this case, the beacon receiver 49 instructs the screen sharing unit 50 to end screen sharing and deletes a beacon pattern stored in the beacon pattern DB 44.

The screen sharing unit 50 is a processing unit which executes screen sharing with a tablet terminal of a sharing source. For example, upon receiving an instruction for screen sharing from the beacon receiver 49, the screen sharing unit 50 moves to a waiting state of screen sharing. For example, upon receiving a request for screen sharing or the like from a tablet terminal of a sharing source, the screen sharing unit 50 becomes a reception waiting state for the request for the screen sharing so as to execute a response for the screen sharing.

Here, by setting a screen sharing method in advance to each of tablets in the classroom 1 in common, the screen sharing unit 50 may transmit a response corresponding to the screen sharing method designated by a sharing source. Upon receiving an instruction for ending screen sharing from the beacon receiver 49, the screen sharing unit 50 ends the screen sharing.

Functional Configuration of Tablet Terminal 60

As illustrated in FIG. 2, the tablet terminal 60 includes a communication unit 61, a display unit 62, a storage unit 63, and a controller 65.

The communication unit 61 is a processing unit which is coupled to a wireless LAN via the access point 2 and controls communication with another tablet terminal, the management computer 10, the server 120, and the like. For example, the communication unit 61 receives textbook data from the management computer 10 via the access point 2. In addition, the communication unit 61 receives an instruction for screen sharing and address information of a screen sharing destination from the management computer 10 via the access point 2. Further, the communication unit 61 transmits screen information such as screen capture to the screen sharing destination via a wireless network described below.

The display unit 62 is a touch panel display which displays each piece of information and accepts operation of a student or the like. For example, the display unit 62 displays textbook data and accepts page turning operation, answer operation to a problem, or the like.

The storage unit 63 is a storage device which stores a program executed by the controller 65 or various kinds of data and is, for example, a memory or a hard disk. The storage unit 63 stores a beacon pattern DB 64.

The beacon pattern DB 64 is a database which stores a beacon pattern which is a combination of transmission frequency channels of a BLE beacon. For example, the beacon pattern DB 64 stores a beacon pattern delivered from the management computer 10. The stored information is the same as in FIG. 3, and a detailed description thereof will be omitted.

The controller 65 is a processing unit which manages the whole of the tablet terminal 60 and is, for example, a processor or the like. The controller 65 includes a display controller 66, a receiver 67, and a screen provider 68. The display controller 66, the receiver 67, and the screen provider 68 are an example of an electronic circuit included in a processor or the like or an example of a process executed by the processor.

The display controller 66 is a processing unit which executes an information display or touch panel operation. For example, the display controller 66 displays textbook data received from the management computer 10 on the display unit 62. In addition, the display controller 66 accepts touch panel operation via the display unit 62 and executes a process corresponding to the accepted touch panel operation.

The receiver 67 is a processing unit which receives a beacon pattern delivered from the management computer 10. For example, the receiver 67 receives a beacon pattern from the management computer 10 via the access point 2 and stores the beacon pattern in the beacon pattern DB 64.

The screen provider 68 is a processing unit which provides screen information displayed on the display unit 62 to a tablet terminal during being disconnected from a wireless LAN. For example, upon receiving an instruction for screen sharing and address information of a sharing destination from the management computer 10, the screen provider 68 executes the screen sharing with a tablet terminal specified by the address information of the sharing destination.

For example, upon receiving a MAC address "A1:B2:C3:F3:E2:D3" of the tablet terminal 40 of the student C being disconnected and a sharing instruction, the screen provider 68 designates a MAC address "A1:B2:C3:F3:E2:D3" and transmits a request for screen sharing via the access point 2. Thereafter, upon receiving a response for screen sharing from the tablet terminal 40 having a MAC address "A1:B2:C3:F3:E2:D3" of the student C being disconnected, the screen provider 68 starts the screen sharing.

For example, the screen provider 68 captures a screen image of textbook data displayed on the display unit 62 and transmits the captured image to the tablet terminal 40 of the student C. In addition, the screen provider 68 captures a screen image every time the screen changes and transmits the captured image to the tablet terminal 40 of the student C.

Here, a wireless network used for screen sharing will be described. For example, there is a case where the tablet terminal 40 being disconnected may be able to connect to a wireless LAN if a distance from the wireless LAN is relatively short. In this case, the screen provider 68 may execute screen sharing with the tablet terminal 40 being disconnected by using a Miracast (registered trademark) which is a wireless LAN display transmission technology. In addition, in a case where the tablet terminal 40 may not be connected to a wireless LAN, a short-range wireless communication technology such as a Bluetooth (registered trademark) (hereinafter, may be referred to as "BT"), a Wireless Gigabit (registered trademark) (WiGig), an ultra wide band (UWB), or the like may be used.

In addition, the screen provider 68 tries to execute screen sharing by a Miracast at first, and then when not successful, the screen provider 68 may also execute the screen sharing by switching to short-range wireless communication such as WiGig. That is, in a case of transmitting a request for screen sharing and receiving a response for the screen sharing via a wireless LAN, the screen provider 68 executes the screen sharing by a Miracast. On the other hand, in a case of transmitting a request for screen sharing and not receiving a response for the screen sharing via a wireless LAN within a predetermined time, the screen provider 68 transmits a request for the screen sharing using the short-range wireless communication technology described above.

Upon receiving an instruction for ending screen sharing from the management computer 10 via the access point 2, the screen provider 68 ends the screen sharing. At this time, the screen provider 68 or the controller 15 may also delete a beacon pattern stored in the beacon pattern DB 64.

Specific Example

Next, a specific example of screen sharing described in Example 1 will be described. FIG. 5 is a diagram for explaining automatic recovery according to Example 1. As illustrated in FIG. 5, in the classroom 1, a class is held by the tablet terminal 30 for teacher, the tablet terminals 40, 60, and 80 for students, and the management computer 10 which are coupled to each other via a wireless LAN through the intermediary of the access point 2. In this state, it is assumed that the tablet terminal 40 is disconnected from the access point 2.

The management computer 10 obtains connection status from the access point 2 and detects unexpected disconnection of the tablet terminal 40 (S1). At this time, the management computer 10 obtains disconnection time from the connection status.

Next, by specifying a beacon pattern assigned to the tablet terminal 40 from the beacon pattern DB 13 and broadcasting an advertised packet including the disconnection time by using the specified beacon pattern, the management computer 10 instructs the tablet terminal 40 being disconnected to move to a waiting state for screen sharing (S2). Thereafter, each of the tablet terminals 40, 60, and 80 receives the advertised packets. When the tablet terminal 40 among the tablet terminals 40, 60, and 80 receives the advertised packets of the tablet terminal 40 and disconnection time included in each of the advertised packets matches with the disconnection time held in the tablet terminal 40, the tablet terminal 40 moves to a waiting state of screen sharing (S3).

Next, the management computer 10 transmits an instruction for screen sharing including a MAC address of the tablet terminal 40 being disconnected to the tablet terminal 60 being connected to the access point 2 via the access point 2 (S4). The tablet terminal 60 which receives the instruction executes screen sharing with the tablet terminal 40 via a new wireless network by using a MAC address of the notified tablet terminal 40 (S5).

Flow of Process

Next, a process of each of devices will be described. Here, a process of the management computer 10, a process of the disconnected tablet terminal 40, and a process of the tablet terminal 60 of a sharing source which executes screen sharing will be described.

Process of Management Computer 10

Figure 6:
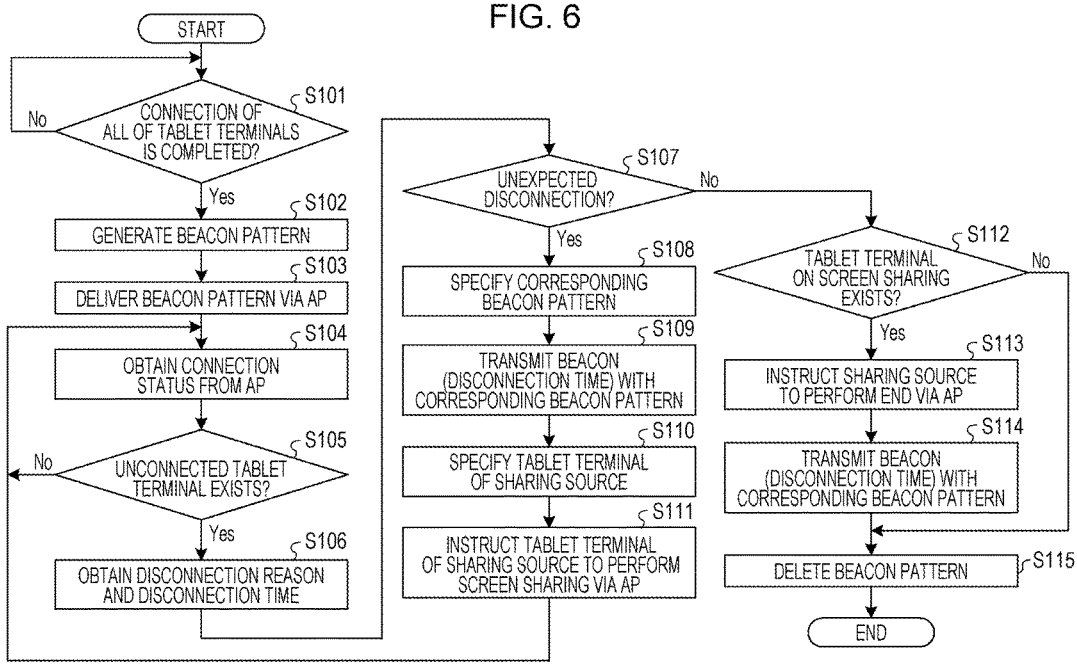
FIG. 6 is a diagram illustrating an example of an operational flowchart for a process of a management computer, according to an embodiment.

FIG. 6 is a flowchart illustrating a flow of a process of the management computer 10 according to Example 1. As illustrated in FIG. 6, when connection of all of tablet terminals is completed (Yes in S101), the pattern generating unit 16 of the management computer 10 generates a beacon pattern (S102). Thereafter, the delivering unit 17 delivers the beacon pattern to each of the tablet terminals via the access point 2 (S103). Then, the pattern generating unit 16 may receive a notification of connection completion from the access point 2 and may also determine the connection completion from connection status obtained from the access point 2.

Next, upon obtaining the connection status from the access point 2 (S104), the monitoring unit 18 determines whether or not an unconnected tablet terminal exists (S105). Here, the monitoring unit 18 stores a disconnection reason and the like in the connection status DB 14. In a case where an unconnected tablet terminal does not exist (No in S105), the monitoring unit 18 repeats S104 and the following steps.

In a case where it is determined by the monitoring unit 18 that an unconnected tablet terminal exists (Yes in S105), the beacon transmitter 19 obtains a disconnection reason and disconnection time (S106). The disconnection reason may be determined also by the management computer 10 or the access point 2 by using the same method.

Thereafter, in a case where the disconnection reason is "unexpected disconnection" (Yes in S107), the beacon transmitter 19 specifies a beacon pattern assigned to a tablet terminal of "unexpected disconnection" from the beacon pattern DB 13 (S108). Next, the beacon transmitter 19 transmits an advertised packet including the disconnection time with the corresponding beacon pattern as a BLE beacon (S109).

Next, the sharing controller 20 specifies a tablet terminal of a sharing source, which provides a screen to a tablet terminal being disconnected and executes screen sharing, by using receiving sensitivity and the like of the connection status DB 14 (S110). Then, the sharing controller 20 notifies address information of the tablet terminal being disconnected to the tablet terminal of the sharing source by communication via the access point 2 (S111). Thereafter, S104 and the following steps are executed.

On the other hand, in a case where the disconnection reason is not "unexpected disconnection" (No in S107), the beacon transmitter 19 determines whether or not a tablet terminal on screen sharing exists with reference to the connection status DB 14 (S112).

Here, in a case where a tablet terminal on screen sharing exists (Yes in S112), the sharing controller 20 instructs the tablet terminal of the sharing source to end screen sharing by communication via the access point 2 (S113). Further, after the beacon transmitter 19 transmits a BLE beacon including disconnection time by using a beacon pattern of a screen sharing destination (S114), the beacon transmitter 19 deletes a beacon pattern stored in the beacon pattern DB 13 (S115). Accordingly, in the screen sharing source, screen sharing is ended and the beacon pattern is deleted. In a case where a tablet terminal on screen sharing does not exist (No in S112), S113 to S114 are not executed and S115 is executed.

Process of Tablet Terminal 40

Figure 7:
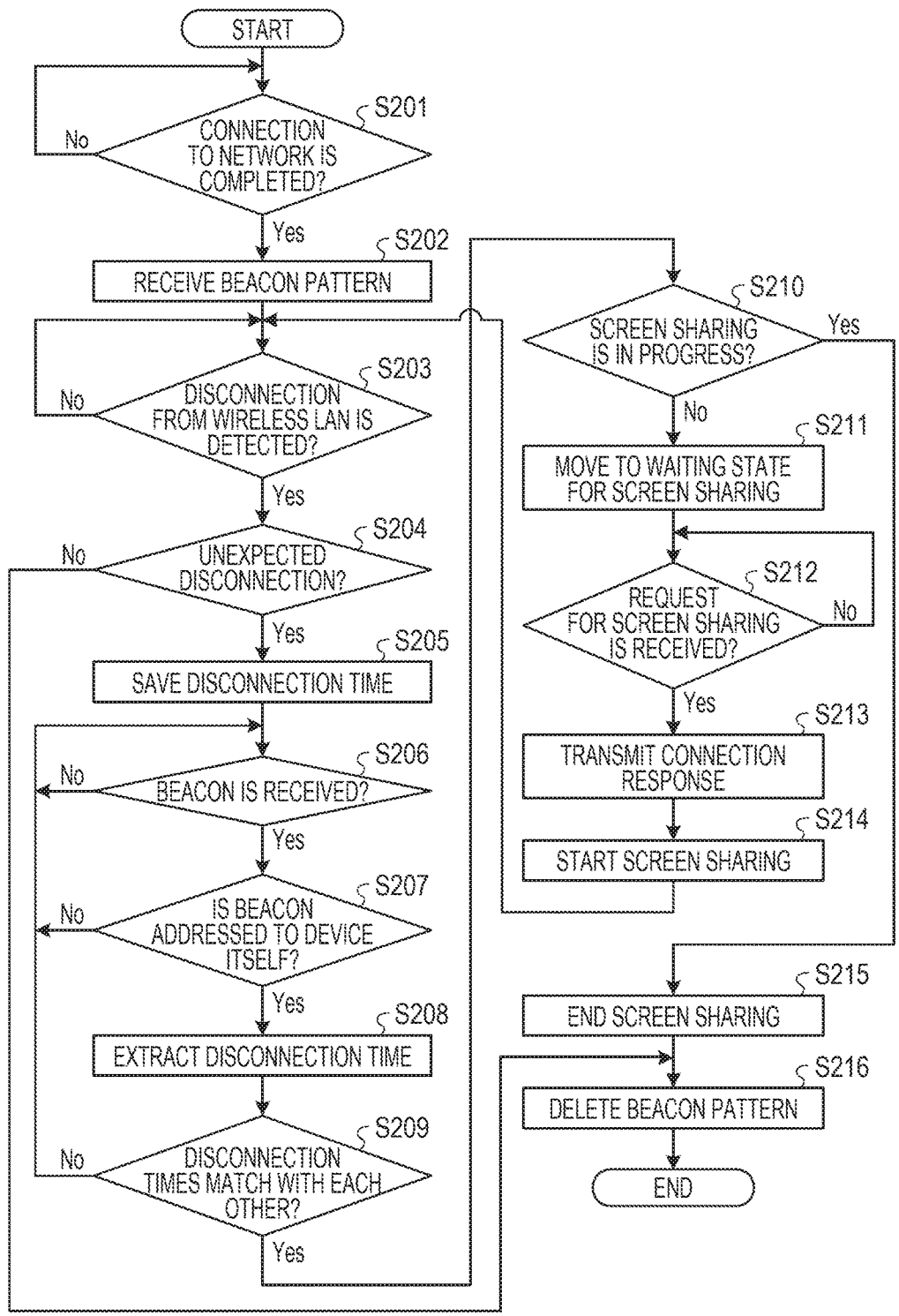
FIG. 7 is a diagram illustrating an example of an operational flowchart for a process of a tablet terminal being disconnected, according to an embodiment.

FIG. 7 is a flowchart illustrating a flow of a process of the tablet terminal 40 being disconnected according to Example 1. As illustrated in FIG. 7, after connection to a wireless LAN is completed (Yes in S201), the receiver 48 of the tablet terminal 40 receives a beacon pattern via a wireless LAN through the intermediary of the access point 2, and stores the beacon pattern in the beacon pattern DB 44 (S202).

Thereafter, upon detecting a tablet disconnected from a wireless LAN (Yes in S203), the controller 46 determines whether or not a disconnection reason is unexpected disconnection (S204). Here, in a case where it is determined that a disconnection reason is unexpected disconnection (Yes in S204), the controller 46 stores the disconnection time in the disconnection time DB 45 (S205).

Thereafter, in a case where a BLE beacon is received (Yes in S206) and it is determined that the BLE beacon is addressed to the beacon receiver 49, based on the beacon pattern (Yes in S207), the beacon receiver 49 extracts disconnection time from each of advertised packets transmitted as a BLE beacon (S208).

In a case where it is determined by the beacon receiver 49 that the extracted disconnection time matches with disconnection time stored in the disconnection time DB 45 (Yes in S209), the screen sharing unit 50 determines whether or not screen sharing is in progress by using connection status or the like of a wireless line (S210).

Here, in a case where screen sharing is not in progress (No in S210), the screen sharing unit 50 moves to a waiting state for screen sharing (S211). Next, upon receiving a request for screen sharing via a wireless network without going through the access point 2 (Yes in S212), the screen sharing unit 50 transmits a connection response via the corresponding wireless network (S213) and starts the screen sharing (S214). Thereafter, S203 and the following steps are repeated.

On the other hand, in a case where screen sharing is in progress (Yes in S210), the screen sharing unit 50 ends the screen sharing (S215). In addition, in a case where it is determined that a disconnection reason is not unexpected disconnection in S204 (No in S204), the controller 46 deletes a beacon pattern stored in the beacon pattern DB 44 (S216).

Process of Tablet Terminal 60

Figure 8:
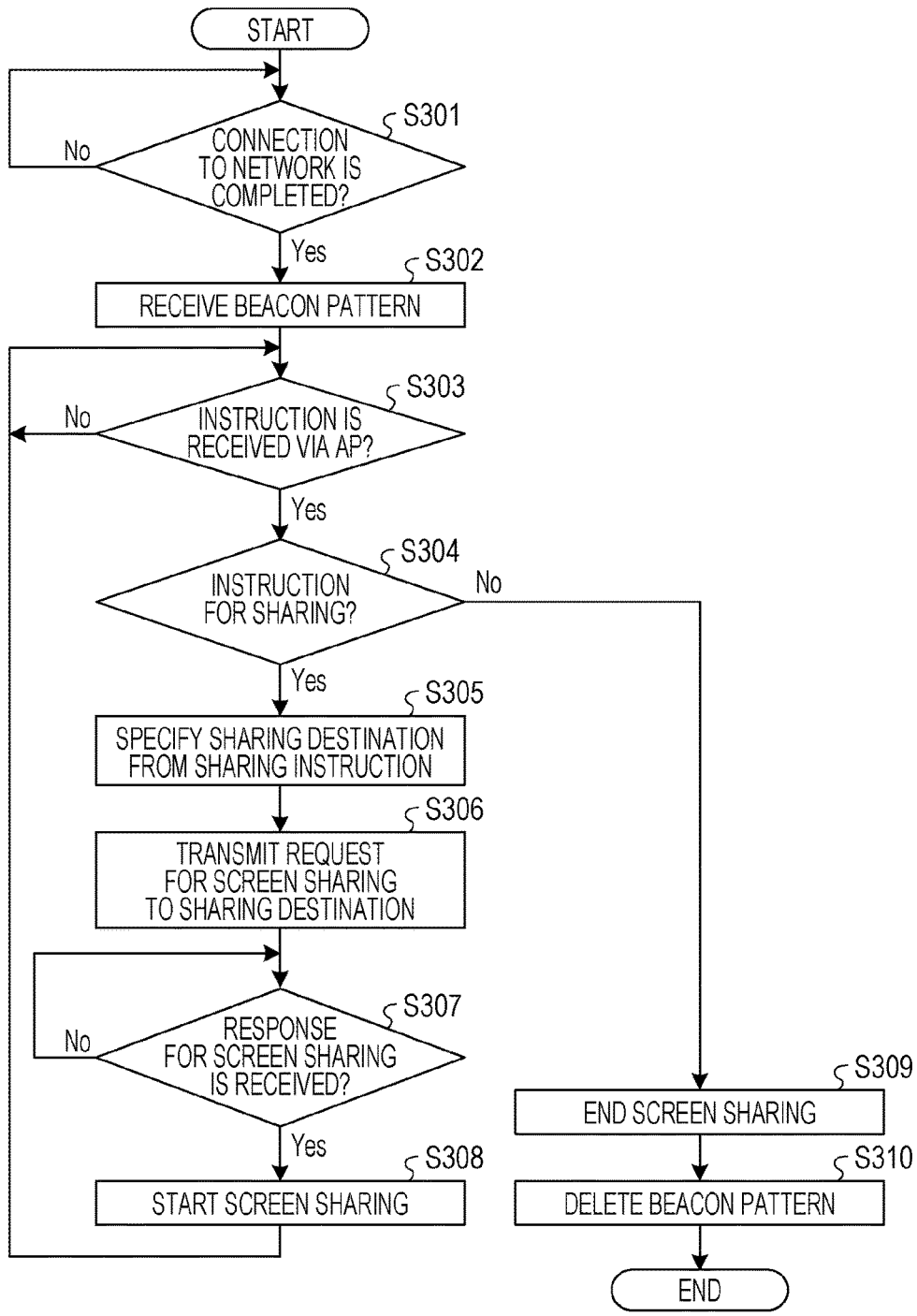
FIG. 8 is a diagram illustrating an example of an operational flowchart for a process of a tablet terminal of a sharing source, according to an embodiment.

FIG. 8 is a flowchart illustrating a flow of a process of the tablet terminal 60 of a sharing source according to Example 1. As illustrated in FIG. 8, after connection to a wireless LAN is completed (Yes in S301), the receiver 67 of the tablet terminal 60 receives a beacon pattern via wireless LAN through the intermediary of the access point 2, and saves the beacon pattern in the beacon pattern DB 64 (S302).

Thereafter, in a case where an instruction is received by communication via the access point 2 (Yes in S303) and the instruction is a sharing instruction (Yes in S304), the screen provider 68 reads address information from the received sharing instruction and specifies a sharing destination (S305).

When transmitting a request for screen sharing to the sharing destination (S306) and receiving a response for screen sharing from the sharing destination (Yes in S307), the screen provider 68 starts the screen sharing (S308). Thereafter, S303 and the following steps are repeated.

On the other hand, in a case where the instruction by communication via the access point 2 is not a sharing instruction (No in S304), the screen provider 68 determines that the instruction to be an instruction for ending screen sharing, and ends the screen sharing (S309). Thereafter, the controller 15 deletes a beacon pattern stored in the beacon pattern DB 64 (S310).

Effect

As described above, by securely broadcasting a recovery instruction with a BLE beacon to a tablet terminal disconnected from the access point 2, the management computer 10 may cause a nearby tablet terminal coupled to the access point 2 to share a screen of the nearby tablet terminal with the tablet terminal. As a result, it is possible to remotely and safely provide screen information to a tablet terminal which may not be connected to the access point 2 without going through a person.

In addition, in a case where a wireless LAN disconnection occurs and a BLE beacon which each of tablet terminals for students receives is addressed to the tablet terminal for student, pieces of information about disconnection time are compared and wireless LAN recovery operation is performed when the pieces of information about disconnection time match with each other. Therefore, since the tablet terminal for student receives the BLE beacon only when disconnected from a wireless LAN and performs wireless LAN recovery operation only when pieces of information about disconnection time match with each other, it is possible to realize more securely remote recovery. In addition, since only disconnection time is transmitted and leakage of address information of a tablet terminal may be suppressed even if the disconnection time leaks to an outside, the management computer 10 may minimize damage caused by a malicious third party.

Example 2

In Example 1, an example in which a screen sharing instruction is notified to a tablet terminal being disconnected by using a beacon pattern and broadcasting is described, but the example is not limited thereto. For example, it is possible to directly connect to a tablet terminal being disconnected and instruct screen sharing by using BT. Therefore, in Example 2, an example in which the management computer 10 is directly connected to a tablet terminal being disconnected to instruct screen sharing and causes the tablet terminal to perform automatic recovery of screen information will be described.

Description of Automatic Recovery of Example 2

Figure 9:
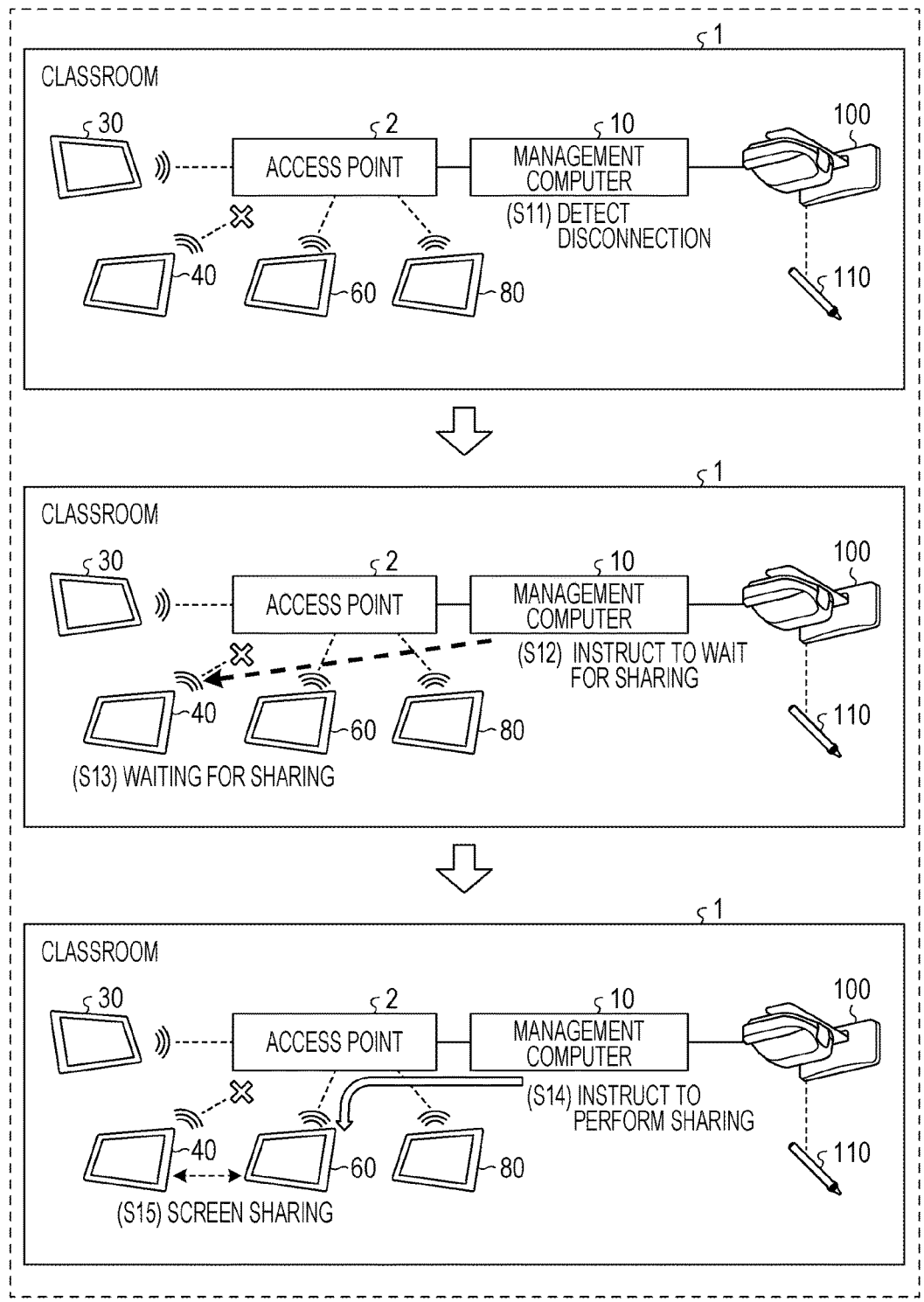
FIG. 9 is a diagram illustrating an example of automatic recovery, according to an embodiment.

FIG. 9 is a diagram for explaining automatic recovery according to Example 2. An overall configuration of a system illustrated in FIG. 9 is the same as that of Example 1.

As illustrated in FIG. 9, in a state in which a class is held using a wireless LAN in the classroom 1, the management computer 10 obtains connection status from the access point 2 and detects unexpected disconnection of the tablet terminal 40 (S11). At this time, the management computer 10 obtains disconnection time from the connection status.

Next, the management computer 10 is directly connected to the tablet terminal 40 being disconnected from a wireless LAN by using BT and instructs the tablet terminal 40 to perform screen sharing (S12). Then, the tablet terminal 40, which may not be connected to a wireless LAN, moves to a waiting state for screen sharing (S13).

Next, the management computer 10 transmits address information of the tablet terminal 40 and a sharing instruction to the tablet terminal 60 with good wireless quality by communication via the access point 2 (S14).

Thereafter, the tablet terminal 60 coupled to the access point 2 executes screen sharing with the tablet terminal 40 via another wireless network by using the address notified from the management computer 10 (S15).

The management computer 10 may disconnect BT connection with the tablet terminal 40 after instructing waiting for screen sharing or after the screen sharing is started.

Functional Configuration

Next, functional configurations of devices illustrated FIG. 9 will be described. Here, among functional configurations of the management computer 10 and the tablet terminal 40, functions different from those of Example 1 will be described. The same reference numerals are given to the same functions, but different processes will be separately described even if the same reference numerals are given.

Functional Configuration of Management Computer 10

Figure 10:
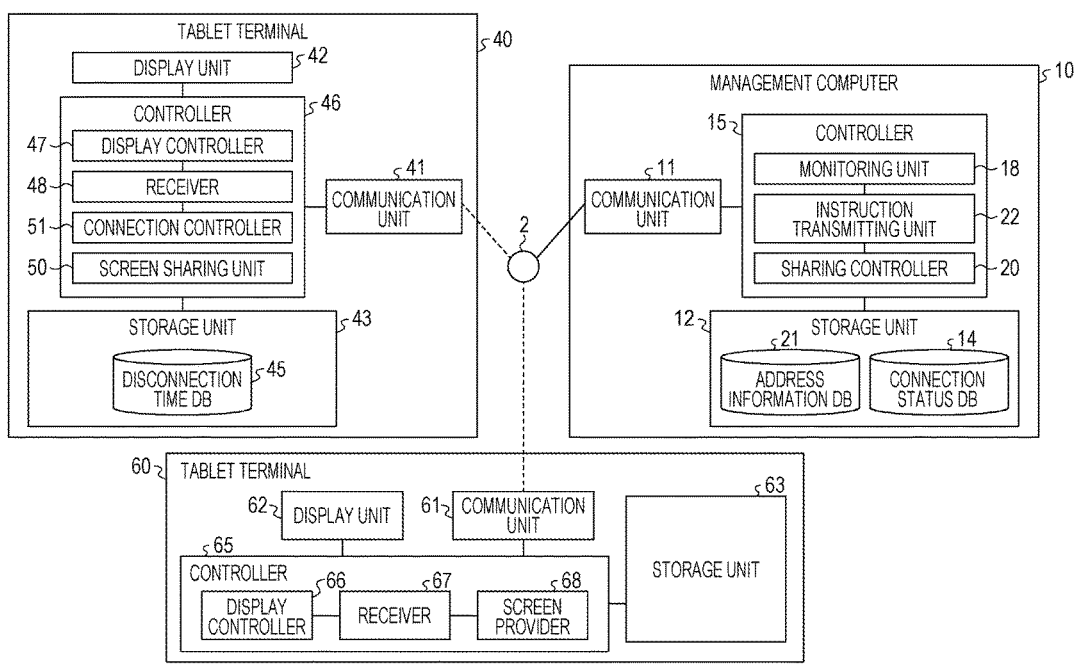
FIG. 10 is a diagram illustrating an example of a functional configuration of each of devices, according to an embodiment.

FIG. 10 is a functional block diagram illustrating a functional configuration of each of devices according to Example 2. As illustrated in FIG. 10, the management computer 10 includes the communication unit 11, the storage unit 12, and the controller 15.

The storage unit 12 is a storage device which stores a program executed by the controller 15 or various kinds of data, and is, for example, a memory or a hard disk. The storage unit 12 stores the connection status DB 14 and an address information DB 21.

The address information DB 21 is address information used for BT connection and stores a Bluetooth (registered trademark) Device address (BD address) of each of the tablet terminals. Information stored here is set and changed by an administrator or the like.

FIG. 11 is a diagram illustrating an example of information stored in the address information DB 21. As illustrated in FIG. 11, the address information DB 21 stores "tablet terminal", "MAC address", and "BD address" in association with each other. "tablet terminal" is a name of a tablet terminal used by a student, and "MAC address" is a MAC address of the tablet terminal for each student. "BD address" is address information used for BT connection.

In the example in FIG. 11, a MAC address of a tablet terminal of the student C is "A1:B2:C3:F3:E2:D3", and a BD address is "B1:C2:D3:G3:F2:E3".

The controller 15 is a processing unit which manages the whole of the management computer 10, and is, for example, a processor or the like. The controller 15 includes the monitoring unit 18, an instruction transmitting unit 22, and the sharing controller 20. The monitoring unit 18, the instruction transmitting unit 22, and the sharing controller 20 are an example of an electronic circuit included in a processor or the like or an example of a process executed by the processor. Since the monitoring unit 18 and the sharing controller 20 execute the same process as Example 1, the instruction transmitting unit 22 having a function different from Example 1 will be described here.

The instruction transmitting unit 22 is a processing unit which establishes BT connection with a tablet terminal being disconnected from a wireless LAN and notifies an instruction for receiving screen sharing from another tablet terminal. For example, upon detecting a tablet terminal in which "unexpected disconnection" is registered with reference to the connection status DB 14, the instruction transmitting unit 22 specifies a BD address of the corresponding tablet terminal from the address information DB 21. The instruction transmitting unit 22 executes BT connection by designating the specified BD address and establishes BT connection with the tablet terminal being disconnected from a wireless LAN, and then transmits an instruction for screen sharing.

For example, upon detecting "unexpected disconnection" of a tablet terminal of the student C with reference to the connection status DB 14, the instruction transmitting unit 22 obtains a BD address "B1:C2:D3:G3:F2:E3" of the tablet terminal of the student C from the address information DB 21. The instruction transmitting unit 22 transmits a BT connection request by designating the BD address "B1:C2:

D3:G3:F2:E3". Thereafter, upon receiving a connection response, the instruction transmitting unit 22 establishes BT connection with a tablet terminal of the student C to which the BD address "B1:C2:D3:G3:F2:E3" is set.

Thereafter, the instruction transmitting unit 22 transmits an instruction for screen sharing to the tablet terminal of the student C by communication via the connected BT. Next, the instruction transmitting unit 22 saves "screen sharing (receiving side)" in "status" of "student C" of the connection status DB 14 and notifies the sharing controller 20 that a screen sharing instruction is transmitted to "student C".

In addition, in a case where "unexpected disconnection" is not registered as a disconnection reason, or nothing is registered as a disconnection reason when a disconnected tablet terminal is detected, the instruction transmitting unit 22 determines that a class is ended. At this time, in a case where a tablet terminal on screen sharing exists, the instruction transmitting unit 22 notifies an instruction for ending screen sharing to the sharing controller 20, establishes BT connection by transmitting a request for BT connection to a tablet terminal of a screen sharing destination, and transmits the instruction for ending screen sharing to the tablet terminal of the screen sharing destination.

Functional Configuration of Tablet Terminal 40

As illustrated in FIG. 10, the tablet terminal 40 includes the communication unit 41, the display unit 42, the storage unit 43, and the controller 46 in the same manner as Example 1. A difference from FIG. 2 described in Example 1 is that the storage unit 43 does not store the beacon pattern DB 44. In addition, the controller 46 includes a connection controller 51 instead of the beacon receiver 49. Here, the connection controller 51 which is a function different from Example 1 will be described.

The connection controller 51 is a processing unit which establishes BT connection with the management computer 10 and receives an instruction for screen sharing via the BT connection. For example, in a case where "unexpected disconnection" is detected by the controller 46, the connection controller 51 moves to a connection waiting state by BT. Thereafter, upon receiving a connection request by BT from the management computer 10, the connection controller 51 transmits a connection response to the management computer 10 by using BT.

In this way, in a state in which the connection controller 51 may not be connected to a wireless LAN, the connection controller 51 establishes BT connection with the management computer 10 and receives an instruction for screen sharing from the management computer 10 by communication different from a wireless LAN.

Thereafter, the connection controller 51 disconnects BT connection with the management computer 10 at a timing at which the tablet terminal 40 starts screen sharing, at a timing at which a predetermined time (for example, 3 minutes) elapses after receiving an instruction for screen sharing by communication with BT, at a timing at which textbook data is displayed on the display unit 42 after BT connection, or at an arbitrary timing.

Upon receiving a request for BT connection from the management computer 10 on screen sharing, the connection controller 51 transmits a connection response to the management computer 10 by using BT. Thereafter, upon receiving an instruction for ending screen sharing, the connection controller 51 notifies the screen sharing unit 50 to end the screen sharing by communication using BT, and then disconnects BT connection.

Functional Configuration of Tablet Terminal 60

As illustrated in FIG. 10, the tablet terminal 60 includes the communication unit 61, the display unit 62, the storage unit 63, and the controller 65 in the same manner as Example 1. A difference from FIG. 2 described in Example 1 is that the storage unit 63 does not store the beacon pattern DB 64. Since the other processes and the like are the same as those in Example 1, a detailed description thereof will be omitted.

Flow of Process

Next, a process of each of devices according to Example 2 will be described. Here, a process of the management computer 10 and a process of the disconnected tablet terminal 40 will be described in the same manner as Example 1. A process of the tablet terminal 60 of a sharing source which executes screen sharing in the same manner as Example 1 will be omitted.

Process of Management Computer 10

Figure 12:
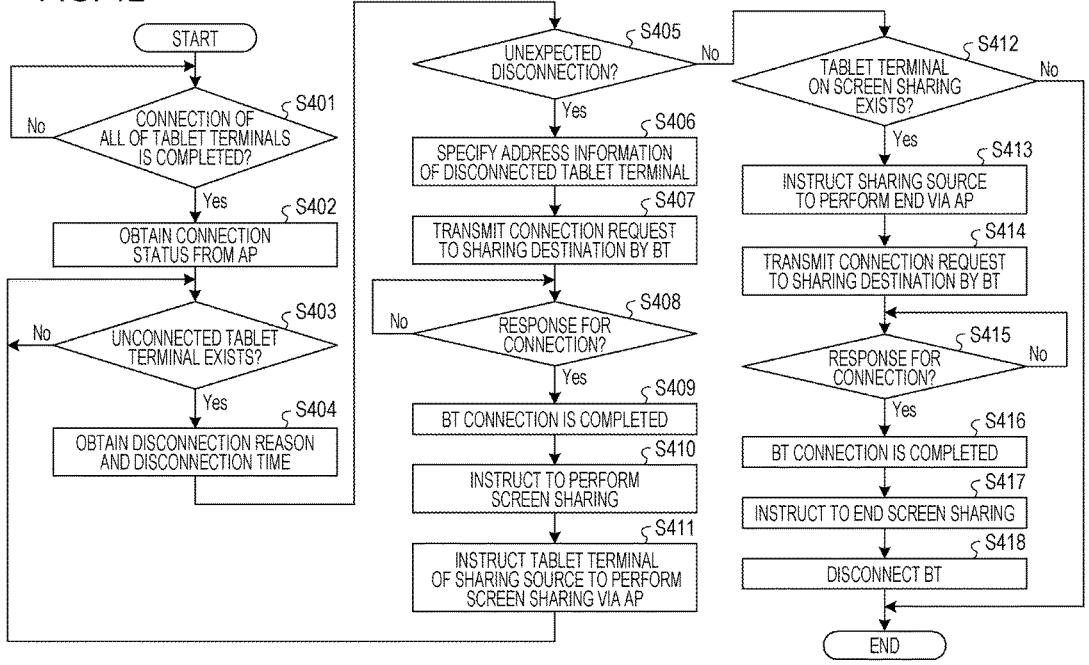
FIG. 12 is a diagram illustrating an example of an operational flowchart for a process of a management computer, according to an embodiment.

FIG. 12 is a flowchart illustrating a flow of a process of the management computer 10 according to Example 2. As illustrated in FIG. 12, when connection of all of tablet terminals is completed (Yes in S401) and connection status is obtained from the access point 2 (S402), the monitoring unit 18 of the management computer 10 determines whether or not an unconnected tablet terminal exists (S403). Here, in a case where an unconnected tablet terminal does not exist (No in S403), the monitoring unit 18 repeats S403 and the following steps.

In a case where it is determined by the monitoring unit 18 that an unconnected tablet terminal exists (Yes in S403), the instruction transmitting unit 22 obtains a disconnection reason and disconnection time (S404).

Thereafter, in a case where the disconnection reason is "unexpected disconnection" (Yes in S405), the instruction transmitting unit 22 specifies address information (BD address) to a tablet terminal during disconnecting corresponding to "unexpected disconnection" from the address information DB 21 (S406).

Next, the instruction transmitting unit 22 transmits a request for BT connection by designating the specified address information (S407). Upon receiving a connection response (Yes in S408), the instruction transmitting unit 22 completes BT connection with the tablet terminal being disconnected (S409).

The instruction transmitting unit 22 transmits an instruction for screen sharing to the tablet terminal being disconnected by using BT (S410). In the same method as Example 1, the sharing controller 20 specifies a tablet terminal of a sharing source which executes screen sharing and instructs to perform screen sharing by notifying address information of the tablet terminal being disconnected to the tablet terminal of the sharing source by communication via the access point 2 (S411). Thereafter, S403 and the following steps are executed.

On the other hand, in a case where the disconnection reason is not "unexpected disconnection" (No in S405), the instruction transmitting unit 22 determines whether or not a tablet terminal on screen sharing exists with reference to the connection status DB 14 (S412).

Here, in a case where a tablet terminal on screen sharing exists (Yes in S412), the sharing controller 20 instructs the tablet terminal of the sharing source to end screen sharing by communication via the access point 2 (S413). Further, the instruction transmitting unit 22 transmits a request for BT connection by using a BD address of a tablet terminal of a screen sharing destination (S414).

Next, upon receiving a connection response from the tablet terminal of the screen sharing destination (Yes in S415), the instruction transmitting unit 22 completes BT connection with the tablet terminal being disconnected (S416). The instruction transmitting unit 22 transmits an instruction for ending screen sharing to the tablet terminal being disconnected by using BT (S417), and then disconnects BT (S418). In S412, in a case where a tablet terminal on screen sharing does not exist (No in S412), the process is ended.

Process of Tablet Terminal 40

Figure 13:
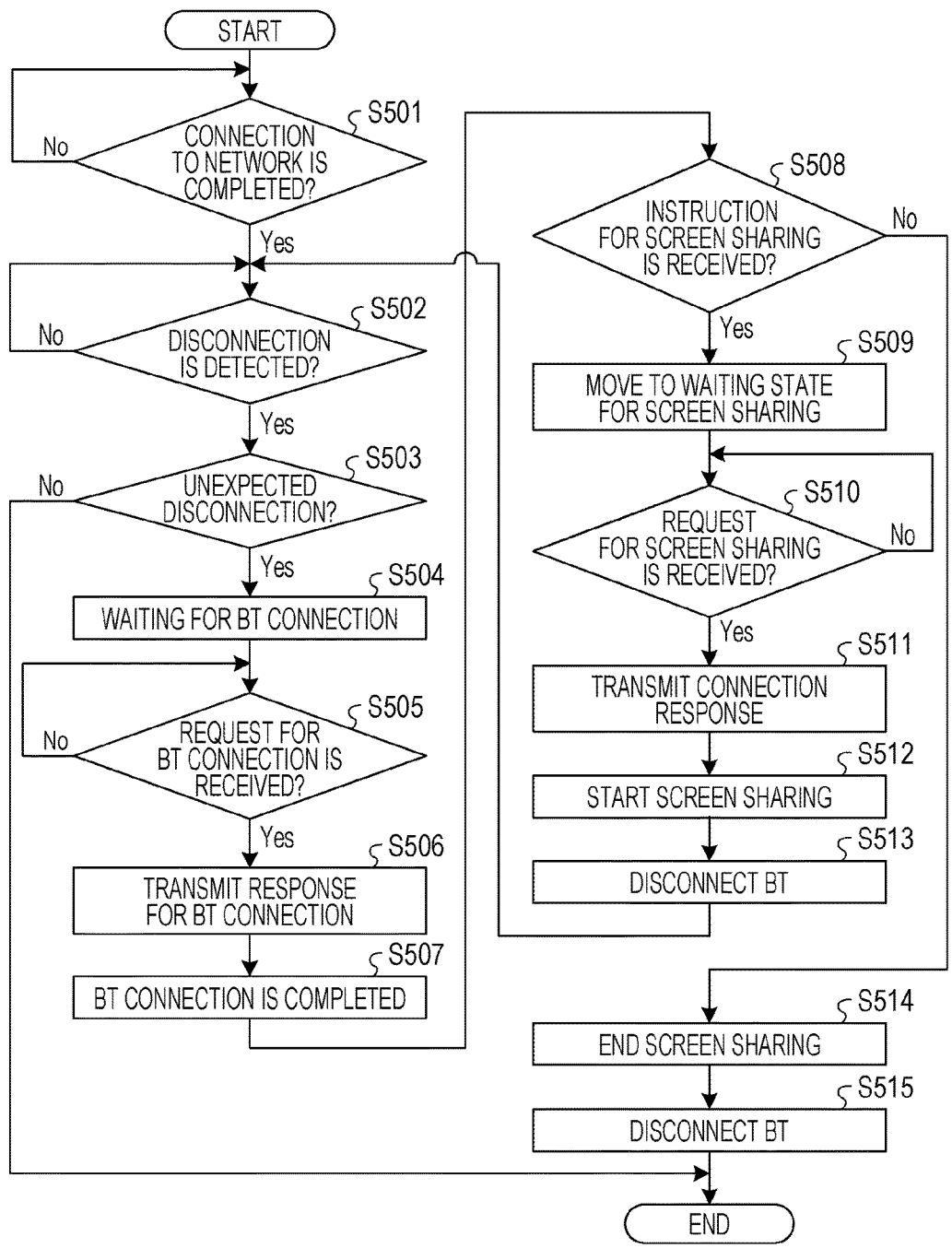
FIG. 13 is a diagram illustrating an example of an operational flowchart for a process of a tablet terminal being disconnected, according to an embodiment.

FIG. 13 is a flowchart illustrating a flow of a process of the tablet terminal 40 being disconnected, according to Example 2. As illustrated in FIG. 13, after connection to a wireless LAN is completed (Yes in S501), upon detecting disconnection from a wireless LAN (Yes in S502), the controller 46 of the tablet terminal 40 determines whether or not a disconnection reason is unexpected disconnection (S503). Here, in a case where a disconnection reason is not unexpected disconnection (No in S503), the controller 46 ends the process.

On the other hand, in a case where it is determined by the controller 46 that a disconnection reason is unexpected disconnection (Yes in S503), the connection controller 51 moves to a connection waiting state by BT (S504). Upon receiving a request for BT connection from the management computer 10 (Yes in S505), the connection controller 51 transmits a connection response for BT connection to the management computer 10 (S506). Then, the connection controller 51 completes BT connection (S507).

Thereafter, upon receiving an instruction for screen sharing by communication via BT (Yes in S508), the connection controller 51 moves to a waiting state for screen sharing (S509). Next, upon receiving a request for screen sharing by a wireless line without going through the access point 2 (Yes in S510), the screen sharing unit 50 transmits a connection response via the corresponding wireless network (S511), and starts the screen sharing (S512). Thereafter, BT is disconnected by the connection controller 51 (S513), and S502 and the following steps are repeated.

On the other hand, in S508, when the connection controller 51 receives an instruction for ending screen sharing by communication via BT (No in S508), the screen sharing unit 50 ends the screen sharing (S514). Thereafter, BT is disconnected by the connection controller 51 (S515).

Effect

In this way, since the management computer 10 is directly connected to a tablet terminal for student which may not be connected to a wireless LAN, and instructs to wait for screen sharing, it is possible to improve a success rate of screen sharing. In addition, since the tablet terminal for student establishes BT connection only during screen sharing operation, it is possible to minimize power consumption.

Example 3

Although the examples of the embodiment are described so far, the embodiment may be implemented in various different forms in addition to the examples described above. Therefore, different examples will be described below.

Wireless Network

Although a wireless LAN or BLE, a wireless LAN and BT, and the like are described as examples in the above examples, the embodiment is not limited thereto. For example, instead of BT or BLE, other non-contact communication or the like may be adopted.

In addition, since advertising channel frequencies (37 ch, 38 ch, and 39 ch) used for the above BLE beacon are not overlapped with channel frequencies (1 ch, 6 ch, and 11 ch) used for an ordinary wireless LAN, it is possible to reduce failure due to radio wave interference. In addition, a beacon is not limited to BLE, another beacon may be adopted, and channels may also be used for other channels not used for a wireless LAN and the like.

Tablet Terminal

Although a tablet terminal for student is described as a target of automatic recovery in the above examples, the embodiment is not limited thereto, and a tablet terminal for teacher may be a target of automatic recovery. In addition, not only a tablet terminal but also another computer such as a smartphone, a server, or the like may be a target of automatic recovery.

Transmission Information

Although an example in which disconnection time is transmitted by a BLE beacon is described in Example 1, it is possible to execute a notification using only a beacon pattern without transmitting disconnection time. By transmitting the disconnection time, it is possible to execute a two-step determination of a notification using the beacon pattern and a coincidence of the disconnection time, thereby improving a security level.

Environment

Although a wireless LAN in a classroom is described as an example in the above examples, the embodiment is not limited thereto and may apply to inside a hospital, inside a warehouse, inside a vehicle, or the like in the same manner.

Hardware Configuration of Management Computer 10

Figure 14:
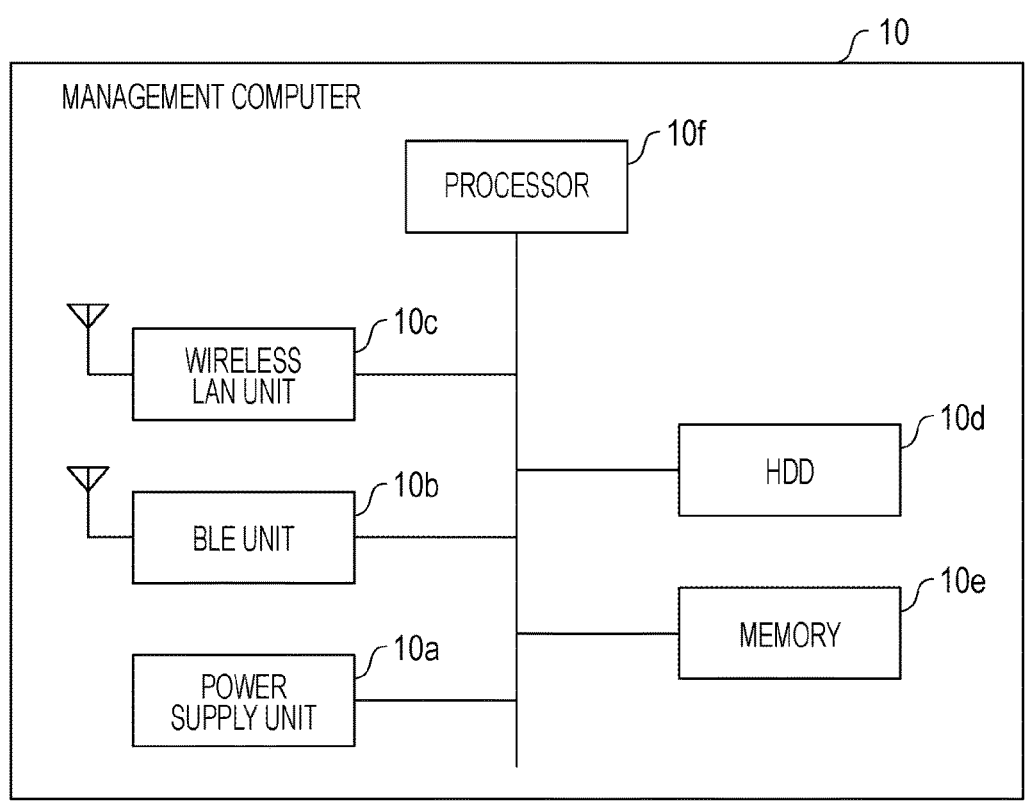
FIG. 14 is a diagram illustrating an example of a hardware configuration of a management computer, according to an embodiment.

FIG. 14 is a diagram illustrating an example of a hardware configuration of the management computer 10. As illustrated in FIG. 14, the management computer 10 includes a power supply unit 10a, a BLE unit 10b, a wireless LAN unit 10c, a hard disk drive (HDD) 10d, a memory 10e, and a processor 10f.

The power supply unit 10a controls a power supply of the management computer 10. The BLE unit 10b executes transmission control of a BLE beacon. The wireless LAN unit 10c is coupled to a wireless LAN via the access point 2 and executes transmission and reception of data. In addition, the wireless LAN unit 10c may establish a plurality of wireless networks of different formats and may also include a plurality of wireless communication units for wireless networks of different formats. The HDD 10d is an example of a storage device which stores a program, data, and the like.

An example of the memory 10e is a random access memory (RAM) such as a synchronous dynamic random access memory (SDRAM), a read only memory (ROM), a flash memory, or the like. An example of the processor 10f is a central processing unit (CPU), a digital signal processor (DSP), a field programmable gate array (FPGA), a programmable logic device (PLD), or the like.

In addition, the management computer 10 operates as an information processing device which executes a screen sharing method by reading and executing a program. That is, the management computer 10 executes a program which executes the same function as the pattern generating unit 16, the delivering unit 17, the monitoring unit 18, the beacon transmitter 19, and the sharing controller 20. As a result, the management computer 10 may execute a process which executes the same function as the pattern generating unit 16, the delivering unit 17, the monitoring unit 18, the beacon transmitter 19, and the sharing controller 20. A program according to the embodiment is not limited to being executed by the management computer 10. For example, even in a case where another computer or another server executes a program or a case where the computer and the server execute a program in cooperation with each other, the embodiment may be applied in the same manner. The same applies to a program which executes the same function as each of functional units described in Example 2.

This program may be distributed via a network such as the Internet. In addition, the program is recorded in a computer readable recording medium such as a hard disk, a flexible disk (FD), a CD-ROM, a magneto-optical disk (MO), a digital versatile disc (DVD) and can be executed by a computer reading from the recording medium.

Hardware Configuration of Tablet Terminal

Figure 15:
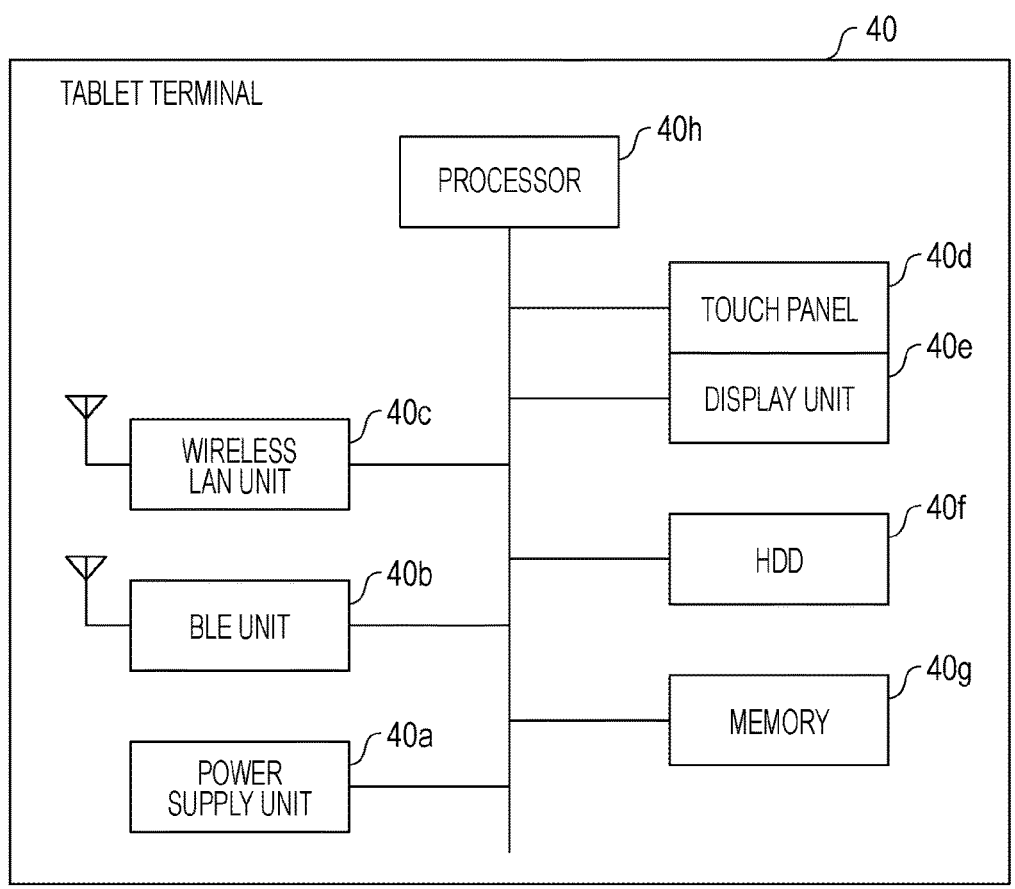
FIG. 15 is a diagram illustrating an example of a hardware configuration of a tablet terminal, according to an embodiment.

Since the tablet terminal 40 and the tablet terminal 60 described above have the same hardware configuration, the tablet terminal 40 will be described here as an example. FIG. 15 is a diagram illustrating an example of a hardware configuration of the tablet terminal 40. As illustrated in FIG. 15, the tablet terminal 40 includes a power supply unit 40a, a BLE unit 40b, a wireless LAN unit 40c, a touch panel 40d, a display unit 40e, an HDD 40f, a memory 40g, and a processor 40h.

The power supply unit 40a controls a power supply of the tablet terminal 40. The BLE unit 40b executes reception control of a BLE beacon. The wireless LAN unit 40c is coupled to a wireless LAN via the access point 2 and executes transmission and reception of data. In addition, the wireless LAN unit 40c may establish a plurality of wireless networks of different formats and may also have a plurality of wireless communication units for wireless networks of different formats.

The touch panel 40d is an input unit which is overlapped with the display unit 40e and accepts user operation, and outputs an operated position (coordinate) to the processor 40h. The touch panel 40d may adopt various methods such as a capacitive method and an electromagnetic induction method. The display unit 40e is an example of a display unit which displays various kinds of information.

The HDD 40f is an example of a storage device which stores a program, data, and the like. An example of the memory 40g is a RAM such as an SDRAM and the like, a ROM, a flash memory, or the like. An example of the processor 40h is a CPU, a DSP, an FPGA, a PLD, or the like.

In addition, the tablet terminal 40 operates as an information processing device which executes a screen sharing method by reading and executing a program. That is, the tablet terminal 40 executes a program which executes the same function as the display controller 47, the receiver 48, the beacon receiver 49, and the screen sharing unit 50. As a result, the tablet terminal 40 may execute a process which executes the same function as the display controller 47, the receiver 48, the beacon receiver 49, and the screen sharing unit 50. A program according to the embodiment is not limited to being executed by the tablet terminal 40. For example, even in a case where another computer or another server executes a program or a case where the computer and the server execute a program in cooperation with each other, the embodiment may be applied in the same manner. The same applies to a program which executes the same function as each of functional units described in Example 2.

This program may be distributed via a network such as the Internet. In addition, the program is recorded in a computer readable recording medium such as a hard disk, a flexible disk (FD), a CD-ROM, an MO, and a DVD and can be executed by a computer reading from the recording medium.

System

In addition, among all processes described in the examples, all or a part of the processes explained as being automatically performed may also be performed manually. Alternatively, all or a part of the processes described as being performed manually may be automatically performed by a known method. Further, processing procedures, control procedures, specific names, and information including various data and parameters illustrated in the document or in the drawings may be arbitrarily changed unless otherwise noted.

In addition, each of components of each of devices illustrated in the drawing is functionally conceptual and is not desirable to be physically configured as illustrated in the drawing. In other words, specific forms of distribution and integration of each of the devices are not limited to those illustrated in the drawings. That is, all or a part thereof may be configured by being functionally or physically distributed and integrated as arbitrary units according to various loads and use situations. Further, all or an arbitrary part of each of processing functions performed in each of the devices may be realized by a CPU and a program analyzed and executed by the CPU, or may be realized as hardware by wired logic.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus comprising:
a memory; and
a processor coupled to the memory and that:
   delivers, via an access point and over a first wireless network, display information to terminal devices on the first wireless network;
   obtains, from the access point, connection status information that represents a connection status between each of the terminal devices and the first wireless network via the access point;

detects, using the connection status information and from among the terminal devices, a first terminal device whose connection to the first wireless network via the access point is disconnected and a second terminal device whose connection to the first wireless network via the access point is connected; and transmits, to the second terminal device over the first wireless network, an instruction to:
   transmit, without going through the access point and from the second terminal device to the first terminal device over a second wireless network that is different from the first network, display information displayed on the second terminal device,
   wherein the second terminal device receives, over the first wireless network, the display information displayed on the second terminal device.

2. The apparatus of claim 1, wherein the processor further:
delivers, to each of the terminal devices, a beacon pattern assigned to each of the terminal devices, wherein the beacon pattern is a combination of transmission frequency channels of a beacon used for the second wireless network; and
broadcasts, based on a beacon pattern assigned to the first terminal device, a beacon including an instruction for receiving the display information displayed on the second terminal device.

3. The apparatus of claim 2, wherein the processor further:
extracts, based on the connection status information, a disconnection time at which connection between the first terminal device and the first wireless network via the access point is disconnected;
transmits, by broadcasting a beacon including the disconnection time based on the beacon pattern assigned to the first terminal device, the instruction for receiving the display information displayed on the second terminal device to the first terminal device, wherein the instruction holds the disconnection time; and
transmits, to the second terminal device, address information and an instruction for executing screen sharing with the first terminal device, wherein the address information is used by the first terminal device in the second wireless network.

4. The apparatus of claim 1, wherein
the memory stores address information used by each of the terminal devices in the second wireless network; and
the processor further:
   establishes, using an address information assigned to the first terminal device, a connection with the first terminal device via the second wireless network;
   transmits, to the first terminal device, an instruction that causes the first terminal device to receive the display information displayed on the second terminal device; and
   transmits, via the first wireless network and to the second terminal device, the address information of the first terminal device and an instruction that causes the second terminal device to execute screen sharing with the first terminal device.

5. A method comprising:
delivering, via an access point and over a first wireless network, display information to terminal devices on the first wireless network;
obtaining, from the access point, connection status information that represents a connection status between each of the terminal devices and the first wireless network via the access point,
detecting, using the connection status information and among the terminal devices, a first terminal device whose connection to the first wireless network via the access point is disconnected and a second terminal device whose connection to the first wireless network via the access point is connected; and
transmitting, to the second terminal device over the first wireless network, an instruction to:
   transmit, without going through the access point and from the second terminal device to the first terminal device over a second wireless network that is different from the first network, display information displayed on the second terminal device,
   wherein the second terminal device receives, over the first wireless network, the display information displayed on the second terminal device; and
transmitting, from the second terminal device to the first terminal device and in response to the instruction, the display information displayed on the second terminal device over the second wireless network.

6. A non-transitory, computer-readable recording medium having stored therein a program that causes a computer to execute a process comprising:
delivering, via an access point and over a first wireless network, display information to terminal devices on the first wireless network;
obtaining, from the access point, connection status information that represents a connection status between each of the terminal devices and the first wireless network via the access point,
detecting, using the connection status information and among the terminal devices, a first terminal device whose connection to the first wireless network via the access point is disconnected and a second terminal device whose connection to the first wireless network via the access point is connected; and
transmitting, to the second terminal device over the first wireless network, an instruction to:
   transmit, without going through the access point and from the second terminal device to the first terminal device over a second wireless network that is different from the first wireless network, display information displayed on the second terminal device,
   wherein the second terminal device receives, over the first wireless network, the display information displayed on the second terminal device.

7. The apparatus of claim 1, wherein
the memory stores position information of each of the terminal devices, and
the processor further detects, among the terminal devices, a terminal device whose connection to the first wireless network via the access point is connected and position is closest to a position of the first terminal device as the second terminal device.

8. The method of claim 5, wherein the detecting of the first terminal device and the second terminal device comprises:
detecting, among the terminal devices, a terminal device whose connection to the first wireless network via the access point is connected and whose position is closest to a position of the first terminal device as the second terminal device.

9. The non-transitory computer-readable recording medium of claim 6, wherein the detecting of the first terminal device and the second terminal device comprises:
 detecting, among the terminal devices, a terminal device whose connection to the first wireless network via the access point is connected and whose position is closest to a position of the first terminal device as the second terminal device.

* * * * *